(12) United States Patent
Wu et al.

(10) Patent No.: US 11,784,765 B2
(45) Date of Patent: *Oct. 10, 2023

(54) REFERENCE SIGNAL SENDING METHOD, REFERENCE SIGNAL RECEIVING METHOD, NETWORK DEVICE, AND TERMINAL DEVICE

(71) Applicant: Huawei Technologies Co., Ltd., Shenzhen (CN)

(72) Inventors: Lu Wu, Shenzhen (CN); Yong Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,138

(22) Filed: Apr. 14, 2022

(65) Prior Publication Data

US 2022/0329378 A1  Oct. 13, 2022

Related U.S. Application Data

(63) Continuation of application No. 16/900,516, filed on Jun. 12, 2020, now Pat. No. 11,329,782, which is a (Continued)

(30) Foreign Application Priority Data

Apr. 28, 2017 (CN) .......................... 201710295299.1

(51) Int. Cl.
*H04L 5/00* (2006.01)
*H04W 76/27* (2018.01)
(Continued)

(52) U.S. Cl.
CPC ........ *H04L 5/0021* (2013.01); *H04J 11/0023* (2013.01); *H04L 5/0048* (2013.01); (Continued)

(58) Field of Classification Search
CPC . H04L 5/0021; H04L 5/00023; H04L 5/0048; H04L 5/0073; H04L 27/2613
See application file for complete search history.

(56) References Cited

U.S. PATENT DOCUMENTS

2011/0176634 A1 7/2011 Yoon et al.
2011/0199986 A1 8/2011 Fong et al.
(Continued)

FOREIGN PATENT DOCUMENTS

CN  101924610 A  12/2010
CN  101964706 A  2/2011
(Continued)

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213 V14.2.0, pp. 1-454, 3rd Generation Partnership Project, Valbonne, France (Mar. 2017).
(Continued)

*Primary Examiner* — Gary Mui
(74) *Attorney, Agent, or Firm* — Leydig, Voit & Mayer, Ltd.

(57) ABSTRACT

A reference signal sending or receiving method includes: determining, by the network device, a plurality of resource elements REs used to carry a first CSI-RS, where the plurality of REs are distributed in a plurality of resource units, and in each resource unit, a plurality of REs used to carry the first CSI-RS are located on a plurality of subcarriers in a same symbol, values of the first CSI-RS carried on at least two REs are different, and values of the first CSI-RS are loaded to the plurality of REs in the resource unit by
(Continued)

using a first multiplex code; and sending, by the network device, the first CSI-RS to the terminal device by using the plurality of REs.

24 Claims, 6 Drawing Sheets

Related U.S. Application Data continuation of application No. 16/525,130, filed on Jul. 29, 2019, now Pat. No. 10,700,834, which is a continuation of application No. PCT/CN2018/084044, filed on Apr. 23, 2018.

(51) Int. Cl.
*H04J 11/00* (2006.01)
*H04L 27/26* (2006.01)

(52) U.S. Cl.
CPC ............ *H04L 5/0073* (2013.01); *H04L 27/26* (2013.01); *H04L 27/2613* (2013.01); *H04W 76/27* (2018.02)

(56) References Cited

U.S. PATENT DOCUMENTS

| | | |
|---|---|---|
| 2012/0257553 A1 | 10/2012 | Noh et al. |
| 2012/0287875 A1 | 11/2012 | Kim et al. |
| 2013/0156001 A1 | 6/2013 | Gomadam |
| 2013/0208678 A1 | 8/2013 | Zhang |
| 2013/0272151 A1 | 10/2013 | Thomas et al. |
| 2014/0133340 A1 | 5/2014 | Zhou et al. |
| 2015/0117291 A1 | 4/2015 | Seo et al. |
| 2015/0289249 A1 | 10/2015 | Noh et al. |
| 2016/0248562 A1 | 8/2016 | Nam et al. |
| 2016/0337874 A1 | 11/2016 | Yang et al. |
| 2017/0181094 A1 | 6/2017 | Ren |
| 2018/0026769 A1 | 1/2018 | Lee et al. |
| 2018/0139029 A1 | 5/2018 | Yoon et al. |
| 2018/0191526 A1 | 7/2018 | Xu |
| 2018/0262314 A1 | 9/2018 | Xia et al. |
| 2018/0278313 A1 | 9/2018 | Kim et al. |
| 2018/0279152 A1 | 9/2018 | Kim et al. |
| 2019/0181936 A1 | 6/2019 | Park et al. |
| 2020/0014450 A1 | 1/2020 | Park et al. |

FOREIGN PATENT DOCUMENTS

| | | |
|---|---|---|
| CN | 102195741 A | 9/2011 |
| CN | 102549997 A | 7/2012 |
| CN | 102687421 A | 9/2012 |
| CN | 102804625 A | 11/2012 |
| CN | 103069761 A | 4/2013 |
| CN | 103259583 A | 8/2013 |
| CN | 103856310 A | 6/2014 |
| CN | 103944685 A | 7/2014 |
| CN | 104735691 A | 6/2015 |
| CN | 104969637 A | 10/2015 |
| CN | 105812106 A | 7/2016 |
| JP | 2012531798 A | 12/2012 |
| JP | 2013502139 A | 1/2013 |
| JP | 2013506337 A | 2/2013 |
| JP | 2013507891 A | 3/2013 |
| JP | 2015167383 A | 9/2015 |
| WO | 2011156974 A1 | 12/2011 |
| WO | 2013070023 A1 | 5/2013 |
| WO | 2016026357 A1 | 2/2016 |
| WO | 2016126063 A1 | 8/2016 |
| WO | 2017050209 A1 | 3/2017 |

OTHER PUBLICATIONS

"DL CSI-RS design for NR CSI acquisition," 3GPP TSG RAN WG1 Meeting #87, Reno, USA, R1-1611241, pp. 1-7, 3rd Generation Partnership Project, Valbonne, France (Nov. 14-18, 2016).

"3rd Generation Partnership Project;Technical Specification Group Radio Access Network; Evolved Universal Terrestrial Radio Access (E-UTRA); Physical channels and modulation (Release 14)," 3GPP TS 36.211 V14.7.0, pp. 75-77, 3rd Generation Partnership Project, Valbonne, France (Jun. 2018).

"3rd Generation Partnership Project; Technical Specification Group Radio Access Network; Evolved Universal Terrestrial Radio Access (E-UTRA); Physical channels and modulation (Release 12)," 3GPP TS 36.211 V12.3.0, pp. 1-124, 3rd Generation Partnership Project, Valbonne, France (Sep. 2014).

"CSI-RS Pattern Design," 3GPP TSG RAN WG1 meetiny#61bis, R1-104204, Dresden, Germany, Total 12 pages, 3rd Generation Partnership Project, Valbonne, France (Jun. 28-Jul. 2, 2010).

"Summary of Views on CSI-RS for NR," 3GPP TSG RAN WG1 88bis, R1-1706571,Spokane, USA, Total 5 pages, 3rd Generation Partnership Project, Valbonne, France (Apr. 3-7, 2017).

"CSI-RS sequence considerations," 3GPP TSG RAN WG1 Meeting#63bis, R1-110205, Dublin, Ireland, pp. 1-2, 3rd Generation Partnership Project, Valbonne, France (Jan. 17-21, 2011).

"CSI-RS design for beam management," 3GPP TSG RAN WG1 Meeting #88bis, Spokane, Washington, USA, R1-1704490, Total 4 pages, 3rd Generation Partnership Project, Valbonne, France (April 3-7, 2017).

"On DL QCL for NR," 3GPP TSG RAN WG1#88b, Spokane, USA, R1-1705358, Total 6 pages, 3rd Generation Partnership Project, Valbonne, France (Apr. 3-7, 2017).

U.S. Appl. No. 16/900,516, filed Jun. 12, 2020, Patented.
U.S. Appl. No. 16/525,130, filed Jul. 29, 2019, Patented.

Guo et al., "Research on E-MBMS Transmission Technology Based on LTE," Guangdong Communication technology, Total 6 pages (2010). With an English Abstract.

Wang et al., "An efficient design of LTE reference signal and performance analysis," Journal of China University of Metrology, vol. 22, No. 4, Total 9 pages (Dec. 2011). With an English Abstract.

"CSI-RS design for CSI acquisition," 3GPP TSG RAN WG1 Meeting #88bis, Spokane, USA, R1-1704236, Total 8 pages, 3rd Generation Partnership Project, Valbonne, France (Apr. 3-7, 2017).

"Consideration on intra cell CSI-RS pattern," 3GPP TSG-RAN WG1 #60bis, Montreal, Canada, R1-103143, Total 4 pages, 3rd Generation Partnership Project, Valbonne, France (May 10-14, 2010).

REFERENCE SIGNAL SENDING METHOD, REFERENCE SIGNAL RECEIVING METHOD, NETWORK DEVICE, AND TERMINAL DEVICE

CROSS-REFERENCE TO RELATED APPLICATIONS

This application is a continuation of U.S. patent application Ser. No. 16/900,516, filed on Jun. 12, 2020, which is a continuation of U.S. patent application Ser. No. 16/525,130, filed on Jul. 29, 2019, now U.S. Pat. No. 10,700,834, which is a continuation of International Application No. PCT/CN2018/084044, filed on Apr. 23, 2018. The International Application claims priority to Chinese Patent Application No. 201710295299.1, filed on Apr. 28, 2017. All of the aforementioned patent applications are hereby incorporated by reference in their entireties.

TECHNICAL FIELD

This application relates to the communications field, and more specifically, to a reference signal sending method, a reference signal receiving method, a network device, and a terminal device.

BACKGROUND

In a new radio access technology (NR) system, to support high-frequency wireless communication, impact caused by phase noise and switching of analog beams needs to be considered for resource configuration of a channel state information-reference signal (CSI-RS). A high-frequency wireless communication system uses spectrum resources in a high frequency band, to implement high-rate short-distance transmission and meet requirements on a 5G capacity and transmission rate. However, in the high-frequency wireless communications system, the phase noise is much less sensitive to frequency than to time, and to overcome a high path loss in the high frequency band, a physical layer needs to use a high-gain narrow beam antenna to improve coverage of a communications link. In such a process, the antenna may need to frequently switch between beams. The various factors described above require that a communications device complete channel measurement within a short period of time, to reduce the impact caused by the phase noise and impact caused to beam switching. Therefore, in the NR, it is considered to configure CSI-RSs in a same symbol (for example, an orthogonal frequency division multiplexing (OFDM) symbol).

On the other hand, as multi-antenna technologies develop, CSI-RSs at different antenna ports in a same network device may be multiplexed on a resource through code division, in other words, code division multiplexing (CDM). For example, the network device distinguishes between the different antenna ports by using different orthogonal cover codes (OCC). In the NR, to ensure that CSI-RSs at each antenna port are configured in a same symbol, resources of different antenna ports may be distinguished through frequency domain CDM, for example, frequency domain CDM2 and frequency domain CDM4. However, when a plurality of network devices send CSI-RSs by using a same antenna port and a same time-frequency resource, a same OCC code may be used. In this case, although the two CSI-RSs use different identifiers $N_{ID}^{CSI}$, the two CSI-RSs may still be strongly correlated and cause interference to each other.

SUMMARY

This application provides a reference signal sending method, a reference signal receiving method, a network device, and a terminal device, to reduce correlation between CSI-RSs and reduce interference caused between the CSI-RSs.

According to a first aspect, a reference signal sending method is provided. The method includes: determining, by a network device, a plurality of resource elements (REs) used to carry a first CSI-RS, where the plurality of REs are distributed in a plurality of resource units, where in each resource unit, a plurality of REs used to carry the first CSI-RS are located on a plurality of subcarriers in a same symbol, values of the first CSI-RS carried on at least two REs are different, and values of the first CSI-RS are loaded to the plurality of REs in the resource unit by using a first multiplex code; and sending, by the network device, the first CSI-RS to a terminal device by using the plurality of REs.

It should be noted that the first CSI-RS may be selected from a first pilot sequence generated by the network device in advance. In other words, the first CSI-RS includes some or all sequence elements in the first pilot sequence. In this embodiment of the present invention, each sequence element in a pilot sequence may be referred to as a value of a CSI-RS, and a quantity of sequence elements in the pilot sequence may be referred to as a sequence length of the pilot sequence. Correspondingly, a quantity of different CSI-RS values of a CSI-RS at each antenna port in each symbol in each resource unit is referred to as a sequence length of the CSI-RS at the antenna port in the symbol in the resource unit. It may be understood that each CSI-RS value corresponds to a sequence element in the pilot sequence, and different CSI-RS values correspond to different sequence elements in the pilot sequence. In the prior art, a plurality of REs in a same symbol in a same resource unit carry a same CSI-RS value. In other words, a CSI-RS at each antenna port has a symbol length of 1 in one symbol in one resource unit. However, in this embodiment of the present invention, a CSI-RS at each antenna port has a sequence length of at least 2 in each symbol in each resource unit. Compared with the prior art, the sequence length is increased and correlation between sequences is reduced. Therefore, when two network devices send CSI-RSs by using a same time-frequency resource and a same multiplex code, because the CSI-RS provided in this embodiment of the present invention is used, a sequence length in a same symbol in each resource unit is increased, and correlation between sequences is reduced, so that interference between the two CSI-RSs is reduced, thereby facilitating channel estimation and improving quality of a received signal.

Optionally, before the determining, by a network device, a plurality of REs used to carry a first CSI-RS, the method further includes: generating, by the network device, the first pilot sequence, where the values of the first CSI-RS are selected from the first pilot sequence.

In other words, the first CSI-RS is generated by using some or all sequence elements in the first pilot sequence. The first pilot sequence may be generated according to a pilot sequence generation method in the prior art, or may be generated according to the method in this embodiment of the present invention.

In other words, the network device generates the first pilot sequence based on a first parameter, and then maps the some or all sequence elements in the first pilot sequence onto the plurality of REs to generate the first CSI-RS. The plurality of REs are distributed in the plurality of resource units. In each resource unit, a plurality of REs used to carry the first CSI-RS are located on the plurality of subcarriers in the same symbol, and the values of the first CSI-RS carried on the at least two REs in the resource unit are different.

According to a second aspect, a reference signal receiving method is provided. The method includes: receiving, by a terminal device on a plurality of resource units, signals sent by a network device, where the signals include a first CSI-RS; determining, by the terminal device, a plurality of resource elements (REs) used to carry the first CSI-RS, where the plurality of REs are distributed in a plurality of resource units, and in each resource unit, a plurality of REs used to carry the first CSI-RS are located on a plurality of subcarriers in a same symbol, values of the first CSI-RS carried on at least two REs are different, and values of the first CSI-RS are loaded to the plurality of REs in the resource unit by using a first multiplex code; and obtaining, by the terminal device, the first CSI-RS on the plurality of REs.

The first CSI-RS may be selected from a first pilot sequence generated by the network device in advance. In other words, the first CSI-RS includes some or all sequence elements in the first pilot sequence. In this embodiment of the present invention, each sequence element in a pilot sequence may be referred to as a value of a CSI-RS, and a quantity of sequence elements in the pilot sequence may be referred to as a sequence length of the pilot sequence. Correspondingly, a quantity of different CSI-RS values of a CSI-RS at each antenna port in each symbol in each resource unit is referred to as a sequence length of the CSI-RS at the antenna port in the symbol in the resource unit. It may be understood that, each CSI-RS value corresponds to a sequence element in the pilot sequence, and different CSI-RS values correspond to different sequence elements in the pilot sequence. In the prior art, a plurality of REs in a same symbol in a same resource unit carry a same CSI-RS value. This is, a CSI-RS at each antenna port has a symbol length of 1 in one symbol in one resource unit. However, in this embodiment of the present invention, a CSI-RS at each antenna port has a sequence length of at least 2 in each symbol in each resource unit. Compared with the prior art, the sequence length is increased and correlation between sequences is reduced. Therefore, when two network devices send CSI-RSs by using a same time-frequency resource and a same multiplex code, because the CSI-RS provided in this embodiment of the present invention is used, a sequence length in a same symbol in each resource unit is increased, and correlation between sequences is reduced, so that interference between the two CSI-RSs is reduced, thereby facilitating channel estimation and improving quality of a received signal.

According to a third aspect, a network device is provided. The network device includes various modules configured to perform the reference signal sending method according to any one of the first aspect or the possible implementations of the first aspect.

According to a fourth aspect, a terminal device is provided. The terminal device includes various modules configured to perform the reference signal receiving method according to any one of the second aspect or the possible implementations of the second aspect.

According to a fifth aspect, a network device is provided. The network device includes a transceiver, a processor, and a memory. The processor is configured to control the transceiver to receive or send a signal, the memory is configured to store a computer program, and the processor is configured to invoke the computer program from the memory and run the computer program, to enable the network device to perform the method according to any one of the first aspect or the possible implementations of the first aspect.

According to a sixth aspect, a terminal device is provided. The terminal device includes a transceiver, a processor, and a memory. The processor is configured to control the transceiver to receive or send a signal, the memory is configured to store a computer program, and the processor is configured to invoke the computer program from the memory and run the computer program, to enable the terminal device to perform the method according to any one of the second aspect or the possible implementations of the second aspect.

According to a seventh aspect, a computer program product is provided. The computer program product includes computer program code, and when running on a network device, the computer program code enables the network device to perform the method according to any one of the first aspect or the possible implementations of the first aspect.

According to an eighth aspect, a computer program product is provided. The computer program product includes computer program code, and when running on a terminal device, the computer program code enables the terminal device to perform the method according to any one of the second aspect or the possible implementations of the second aspect.

According to a ninth aspect, a computer readable medium is provided. The computer readable medium stores program code, and the program code includes an instruction used to perform the method according to any one of the first aspect or the possible implementations of the first aspect.

According to a tenth aspect, a computer readable medium is provided. The computer readable medium stores program code, and the program code includes an instruction used to perform the method according to any one of the second aspect or the possible implementations of the second aspect.

Optionally, the values of the first CSI-RS carried on the plurality of REs in each resource unit are different from each other. Optionally, the plurality of REs carry a second CSI-RS, values of the second CSI-RS carried on at least two REs are different, and values of the second CSI-RS are loaded to the plurality of REs by using a second multiplex code.

In other words, when sending a plurality of CSI-RSs, the network device may determine values of the CSI-RSs in a first pilot sequence generated in advance, map the values onto a time-frequency resource, load the values by using a multiplex code to distinguish between antenna ports, and finally send the plurality of CSI-RSs together by using the time-frequency resource. For example, the plurality of CSI-RSs include a first CSI-RS and a second CSI-RS, and the first CSI-RS and the second CSI-RS correspond to different antenna ports and may be multiplexed on a same time-frequency resource through code division.

Optionally, the first pilot sequence is calculated by using the following formulas:

$r_{l,n_s}(b)=g(b), b=0,1,\ldots,N-1$ where $N=f(a, N_{RB}^{max, DL})$, a is a first parameter, $N_{RB}^{max, DL}$ represents a maximum quantity of resource units included on a downlink channel, and $r_{l,n_s}(b)$ represents a value of a $b^{th}$ CSI-RS in an $l^{th}$ symbol in an $n_s^{th}$ slot.

$$r_{l,n_s}(b) = \frac{1}{\sqrt{2}}(1 - 2 \cdot c(2b)) + j\frac{1}{\sqrt{2}}(1 - 2 \cdot c(2b+1)),$$

$b=0,1,\ldots,N-1$ where c is a pseudo-noise (PN) sequence, and may be generated by a PN sequence generator (for example, a Gold sequence generator) based on an initialization sequence $c_{init}$.

This method is similar to a PN sequence generation formula defined in an existing Long Term Evolution (LTE) protocol and therefore is very much compatible with the prior art, and in addition, a sequence length is increased and correlation between pilot sequences is reduced.

Optionally, the first pilot sequence is calculated by using the following formula:

$$r_{l,n_s}(m,n)=h(m,n), m=0,1,\ldots N_{RB}^{max,DL}-1, n=0,1,\ldots,a-1$$

where a is a first parameter, $N_{RB}^{max,\ DL}$ represents a maximum quantity of resource units included on a downlink channel, and $r_{l,n_s}(m,n)$ represents a value of an $n^{th}$ CSI-RS in an $m^{th}$ resource unit in an $l^{th}$ symbol in an $n_s^{th}$ slot.

For example, the first pilot sequence is calculated by using the following formula:

$$r_{l,n_s}(m, n) = \frac{1}{\sqrt{2}}(1 - 2 \cdot c(2(ma + n))) + j\frac{1}{\sqrt{2}}(1 - 2 \cdot c(2(ma + n) + 1)),$$

$$m=0,1,\ldots,N_{RB}^{max,DL}-1$$

Compared with the formula described above, this formula represents, in more dimensions, an RE onto which each sequence element is mapped.

Optionally, a value of the first parameter a includes at least one of the following: a quantity of REs in one symbol in one resource unit; a length of an orthogonal code used by a CSI-RS port during frequency domain code division multiplexing; or a quantity of REs occupied by a CSI-RS port in one symbol in one resource unit.

Optionally, the value of the first parameter a includes at least one of {2, 4, 8, 12}.

In this embodiment of the present invention, the first parameter a may be understood as a maximum quantity of REs that can be occupied by the first CSI-RS in each resource unit. In other words, a maximum quantity of subcarriers occupied by the first CSI-RS in a same symbol in each resource unit is a. However, it should be noted that the quantity of subcarriers occupied by the first CSI-RS in the same symbol in the resource unit does not mean a sequence length of the first CSI-RS in the resource unit. The sequence length of the first CSI-RS needs to be defined based on a quantity of different sequence elements in the resource unit.

Optionally, the first parameter a is preconfigured.

In other words, the first parameter a may be statically configured.

Optionally, the first parameter a is sent to the terminal device after being determined by the network device.

In other words, the first parameter a may be semi-statically or dynamically configured.

According to this application, a sequence length of a CSI-RS at each antenna port in each symbol in each resource unit may be increased, to reduce correlation between sequences and reduce interference between pilot signals.

DESCRIPTION OF EMBODIMENTS

Figure 1:
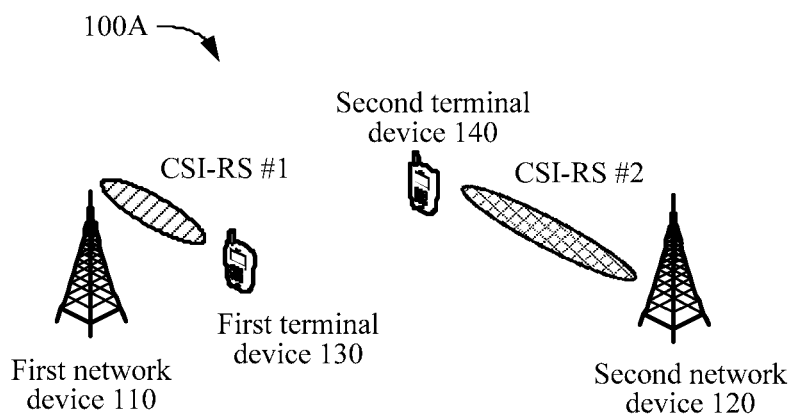
FIG. 1 is a schematic diagram of a communications system to which a reference signal sending method and a reference signal receiving method are applied according to an embodiment of the present invention.

The following describes technical solutions of this application with reference to accompanying drawings.

For ease of understanding embodiments of the present invention, a CSI-RS in an LTE Protocol is briefly described first.

In a Long Term Evolution Advanced (LTE-A) system, to support a multi-antenna technology, a CSI-RS featuring low-density resource distribution is introduced since Release 10 to replace an original cell-specific reference signal (CRS), to ensure that a network device can perform multi-user scheduling based on CSI reported by a terminal device.

In an LTE-A transmission mode (TM) 9, the terminal device uses a CSI-RS for channel estimation. However, in other transmission modes prior to the TM 9, the terminal device still uses a CRS for channel estimation. It may be understood that regardless of whether a CSI-RS or a CRS, or even other reference signals that are used for channel estimation and that are defined in future protocols are used, specific processes in which the terminal device performs channel estimation based on a received reference signal may be similar. For ease of understanding and description, the embodiments of the present invention are described in detail by using a CSI-RS only as an example.

In addition, in a downlink reference signal, the reference signal may usually use a pseudo-noise (PN) sequence. In LTE, a CSI-RS may be generated based on a PN sequence. Specifically, the CSI-RS may be obtained by using the PN sequence that is calculated by using the following formula (formula (1)):

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m=0,1,\ldots,N_{RB}^{max,DL}-1$$

with $c_{init}=2^{10}\cdot(7\cdot(n_s'+1)+l+1)\cdot(2\cdot N_{ID}^{CSI}+1)+2\cdot N_{ID}^{CSI}+N_{CP}$ When the CSI-RS is used as a part of a discovery reference signal (DRS), $n_s'=10\lfloor n_s/10\rfloor+n_s$ mod 2; or in other cases, $n_s'=n_s$. $r_{l,n_s}(m)$ represents an $m^{th}$ sequence element in an $l^{th}$ symbol in an $n_s^{th}$ slots, and $r_{l,n_s}(m)$ is displayed in a complex form obtained by modulating a PN sequence. Optionally, the symbol may be an OFDM symbol, or may be a symbol that is used to represent a time unit and that is defined in a future protocol. This is not particularly limited in this embodiment of the present invention. $N_{RB}^{max, DL}$ represents a maximum quantity of RBs included on a downlink channel. c is a PN sequence, and may be generated by a PN sequence generator (for example, a Gold sequence generator) based on an initialization sequence $c_{init}$. $N_{ID}^{CSI}$ is an identifier of a CSI-RS, and may be a cell identifier $N_{ID}^{cell}$ or an identifier configured by a higher layer. $N_{CP}$ is a cyclic suffix identifier and corresponds to a normal CP, and $N_{CP}=1$. For an extended CP, $N_{CP}=0$.

It may be learned from the foregoing formula that, when $[0, N_{RB}^{max, DL}-1]$ is traversed for a value of m, a PN sequence can be obtained. The PN sequence includes $N_{RB}^{max, DL}$ sequence elements, each sequence element is a complex signal, each sequence element may be referred to as a value of the CSI-RS, and the $N_{RB}^{max, DL}$ sequence elements may be referred to as a sequence length $N_{RB}^{max, DL}$.

The network device may map, based on a predefined pilot pattern and a mapping relationship between sequence elements in a pilot sequence and REs, some or all elements in the generated PN sequence onto the REs one by one, and send a CSI-RS to the terminal device over a channel. The terminal device estimates a channel matrix based on the received CSI-RS and a CSI-RS generated by the terminal device, so that the terminal device can determine a precoding matrix based on the estimated channel matrix, and feed back CSI to the network device.

In LTE, as the multi-antenna technology develops, a same network device may distinguish between different antenna ports through CDM, frequency division multiplexing (FDM), time division multiplexing (TDM), and the like. If FDM or TDM is used, frequency domain resources or time domain resources occupied by CSI-RSs at different antenna ports may be different. If CDM is used, time-frequency resources occupied by CSI-RSs at different antenna ports may be the same, and the different antenna ports are distinguished by using a multiplex code. In LTE, CDM may include frequency domain CDM and time domain CDM. However, in NR, the CSI-RSs are supported to be configured in a same symbol, in other words, frequency domain CDM.

It should be noted that, an antenna port may also be referred to as a CSI-RS port, or more specifically, may be understood as a CSI-RS port that has not been precoded through beamforming. The CSI-RS is defined by the CSI-RS port, and each CSI-RS corresponds to an antenna port. It should be understood that, the CSI-RS, as a reference signal used for channel measurement, is merely used as an example for description and should not be constructed as any limitation on the embodiments of the present invention. This application does not exclude a possibility that in an existing or a future protocol, other names may be used to replace CSI-RS to implement a same function of the CSI-RS.

A scenario to which the embodiments of the present invention are applicable is described below with reference to FIG. 1 and FIG. 2. FIG. 1 is a schematic diagram of a communications system 100A to which a reference signal sending method and a reference signal receiving method are applied according to an embodiment of the present invention. As shown in FIG. 1, the communications system 100A includes a first network device 110, a second network device 120, a first terminal device 130, and a second terminal device 140. The first network device 110 and the second network device 120 may include a plurality of antennas, and transmit data to a terminal device (for example, the first terminal device 130 and/or the second terminal device 140 shown in FIG. 1) by using a multi-antenna technology.

It is assumed that the first network device 110 is a network device in a first cell, and the first terminal device 130 is located in the first cell; and the second network device 120 is a network device in a second cell, and the second terminal device is located in the second cell. If the first network device 110 and the second network device 120 send CSI-RSs to the corresponding first terminal device 130 and second terminal device 140 by using a same port and a same time-frequency resource (for example, an RE), to obtain a CSI fed back for channel estimation, the CSI-RS (for example, denoted as a CSI-RS #1) sent by the first network device 110 to the first terminal device 130 and the CSI-RS (for example, denoted as a CSI-RS #2) sent by the second network device 120 to the second terminal device 140 may be identified by using different $N_{ID}^{CSI}$, in other words, values calculated by using the formula (1) are different.

Because the first network device 110 and the second network device 120 may transmit data with the terminal device by using the multi-antenna technology, the first network device 110 and the second network device 120 may send the CSI-RSs by using a plurality of antenna ports. At the plurality of antenna ports in a same network device, different CSI-RSs may be distinguished through FDM, TDM or CDM described above.

If both the first network device 110 and the second network device 120 use frequency domain CDM (which may be, for example, frequency domain CDM2), a quantity of REs occupied by each CSI-RS in one symbol in one resource block group (RBG) in a resource unit (for example, a resource block (RB)) is a length of an orthogonal code used during the CDM. For example, frequency domain CDM2 indicates that two REs are occupied in one symbol in one resource unit. It can be learned according to the above-described formula (1) that, when symbol quantities/are the same and values of r are the same, values of the CSI-RSs carried on the two REs are the same. This is, a sequence length of the CSI-RS in one symbol in one resource unit is 1. Even though the CSI-RS #1 and CSI-RS #2 use different $N_{ID}^{CSI}$ interference is still caused between the CSI-RS #1 and CSI-RS #2 because other parameters (for example, OCCs) are the same.

Figure 2:
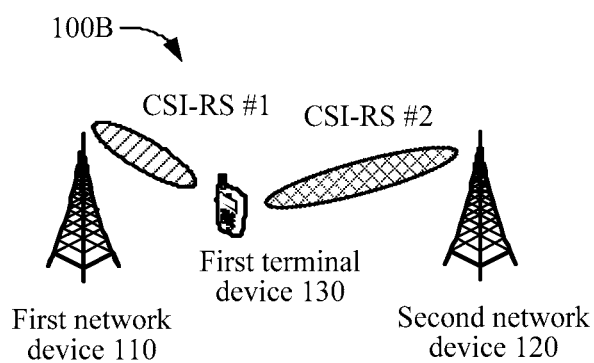
FIG. 2 is another schematic diagram of a communications system to which a reference signal sending method and a reference signal receiving method are applied according to an embodiment of the present invention.

FIG. 2 is a schematic diagram of a communications system 100B to which a reference signal sending method and a reference signal receiving method are applied according to an embodiment of the present invention. As shown in FIG. 2, the communications system 100B includes a first network device 110, a second network device 120, and a first terminal device 130. The first network device 110 and the second network device 120 may include a plurality of antennas, and transmit data to the first terminal device 130 by using a multi-antenna technology. Moreover, the first network device 110 and the second network device 120 may transmit data to the first terminal device 130 by using a coordinated multipoint (CoMP) transmission method.

Assuming that the first network device 110 sends a CSI-RS #1 to the first terminal device 130, and the second network device 120 sends a CSI-RS #2 to the first terminal device 130, the first network device 110 and the second network device 120 may perform dynamic point selection (DPS) based on CSI fed back by the first terminal device 130. The CSI-RS (for example, denoted as the CSI-RS #1) sent by the first network device 110 to the first terminal device 130 and the CSI-RS (for example, denoted as the CSI-RS #2) sent by the second network device 120 to the first terminal device 130 may be identified by using different $N_{ID}^{CSI}$.

If both the first network device 110 and the second network device 120 use frequency domain CDM, a quantity of REs, occupied by the CSI-RS sent by each network device, in one symbol in one resource unit is a length of an orthogonal code used during the CDM. REs that carry CSI-RSs in a same symbol carry a same CSI-RS value, in other words, a sequence length of a CSI-RS in one symbol in one resource unit is 1. Therefore, even though the CSI-RS #1 and CSI-RS #2 use different $N_{ID}^{CSI}$, interference is still caused between the CSI-RS #1 and CSI-RS #2 because other parameters (for example, antenna ports, time-frequency resources, and OCCs) are the same.

It should be understood that, FIG. 1 and FIG. 2 are simplified schematic diagrams used as an example for ease of understanding, and the communications system may further include more network devices and/or terminal devices that are not shown in the figure.

It can be learned from the foregoing description that, when interference is caused between two CSI-RSs, estimation on a channel matrix may be inaccurate, and consequently, accuracy of a CSI fed back is affected, determining of a precoding matrix may finally be affected, further affecting quality of received data.

However, it is found through a simulation experiment or calculation on correlation that, when the sequence length is 1, correlation between sequences is relatively strong; and a longer sequence indicates lower correlation between the sequences. Therefore, this application provides a reference signal sending method and a reference signal receiving method, to increase a sequence length of a pilot sequence corresponding to each port in a symbol, reduce correlation between sequences, and reduce interference.

Embodiments of the present invention are described in detail below with reference to the accompanying drawings.

It should be understood that, technical solutions in this application may be applied to various communications systems, for example, a Global System for Mobile communications (GSM), a Code Division Multiple Access (CDMA) system, a Wideband Code Division Multiple Access (WCDMA) system, a general packet radio service (GPRS), a Long Term Evolution (LTE) system, a Long Term Evolution Advanced (LTE-A) system, a Universal Mobile Telecommunications System (UMTS), or a next-generation communications system (for example, a fifth-generation (5G) communications system). The 5G system may also be referred to as a new radio access technology (NR) system.

This application describes the embodiments with reference to a network device. The network device may be a base transceiver station (BTS) in Global System for Mobile communications (GSM) or Code Division Multiple Access (CDMA), or may be a NodeB (NB) in Wideband Code Division Multiple Access (WCDMA), or may be an evolved NodeB (evolved node B, eNB or eNodeB) in Long Term Evolution (LTE), or a relay station, an access point or a remote radio unit (RRU), or an in-vehicle device, a wearable device, or a network side device in a future 5G system such as a transmission point (TP), a transmission reception point (TRP), a base station, and a small base station device. This is not particularly limited in embodiments of the present invention.

In addition, this application describes embodiments with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), may be a cellular phone, a cordless phone, a Session Initiation Protocol (SIP) phone, a wireless local loop (WLL) station, a personal digital assistant (PDA) device, a handheld device having a wireless communication function, a computing device, another processing device connected to a wireless modem, an in-vehicle device, a wearable device, and a next generation communication system, for example, a terminal device in a 5G network, or a terminal device in a future evolved public land mobile network (PLMN). This is not particularly limited in embodiments of this application.

It should be further understood that, in embodiments of the present invention, numbers "first" and "second" are merely used to distinguish between different objects, for example, to distinguish between different pilot sequences and different CSI-RSs, and should not be constructed as any limitation on the embodiments of the present invention.

Figure 3:
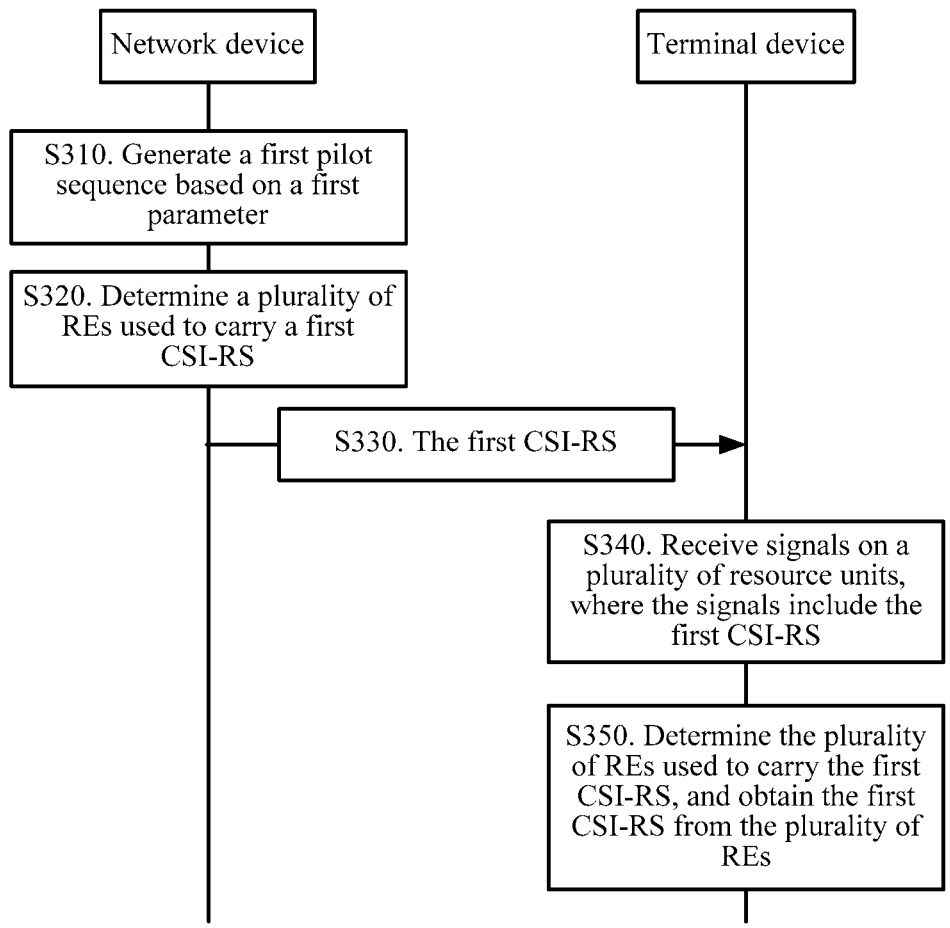
FIG. 3 is a schematic flowchart of a reference signal sending method or a reference signal receiving method according to an embodiment of the present invention.

FIG. 3 is a schematic flowchart of a reference signal sending or reference signal receiving method 300 according to an embodiment of the present invention from the perspective of device interaction. The method 300 described below may be applied to a communications system that performs communication by using a radio air interface. The communications system may include at least two network devices and at least one terminal device. For example, the communications system may be the communications system 100A shown in FIG. 1, or the communications system 100B shown in FIG. 2. The network device may be the first network device 110 or the second network device 120 shown in FIG. 1 or FIG. 2, and the terminal device may be the first terminal device 130 or the second terminal device 140 shown in FIG. 1, or the first terminal device 130 shown in FIG. 2.

It should be noted that, in this embodiment of the present invention, without loss of generality, the reference signal sending method and the reference signal receiving method according to this embodiment of the present invention are described in detail by using a CSI-RS as an example. However, it should be understood that this should not be constructed as any limitation on this embodiment of the present invention, and the method is also applicable to other reference signals.

It should be understood that in an existing protocol (for example, an LTE protocol), a downlink reference signal may usually use a PN sequence, and in LTE, the PN sequence is defined by a Gold sequence. For ease of understanding and description only, this specification describes this embodiment of the present invention in detail by using the PN sequence as an example. However, this should not be constructed as any limitation on this embodiment of the present invention, and this application does not exclude a possibility that another sequence such as a Zadoff-Chu (ZC) sequence may be used in a future protocol to generate a downlink reference signal. Moreover, the reference signal sending method and the reference signal receiving method according to this embodiment of the present invention are not limited to a downlink reference signal, and are also applicable to an uplink reference signal.

As shown in FIG. 3, the method 300 includes the following steps.

S310. A network device generates a first pilot sequence based on a first parameter.

In this embodiment of the present invention, a sequence length of a PN sequence used to generate a CSI-RS is not only correlated to $N_{RB}^{max, DL}$, but also correlated to the first parameter a provided in this embodiment of the present invention. The network device may generate the first pilot sequence based on the first parameter a. Herein, for ease of distinguishing and description, a pilot sequence generated by the network device is denoted as the first pilot sequence, and a pilot sequence generated by a terminal device described below is denoted as a second pilot sequence. Correspondingly, a CSI-RS generated by the network device based on the first pilot sequence is denoted as a first CSI-RS, and a CSI-RS generated by the terminal device based on the second pilot sequence is denoted as a third CSI-RS.

Optionally, a value of the first parameter a includes at least one of the following:

A. A quantity of REs in one symbol in one resource unit. A specific quantity may be determined based on a definition of the resource unit in the existing or the future protocol. For example, the resource unit defined in an LTE protocol may be an RB, and a quantity of REs in one symbol in one RB may be 12.

In this embodiment of the present invention, the resource unit may be one RB or RBG or a plurality of RBs or RBGs in the LTE protocol, or a redefined resource including at least two REs. For ease of understanding and description, this embodiment of the present invention is described by using an example in which a resource unit is an RB. For brevity, same or similar cases are omitted below.

B. A length of an orthogonal code used by an antenna port during frequency domain CDM. A specific value may be determined based on a length that is of an orthogonal code for CDM and that is defined in the existing or future protocol. For example, in the LTE protocol, CDM2 and CDM4 are defined, and therefore, the value of a may be any value in {2, 4}.

C. A quantity of REs occupied by an antenna port in a symbol. A specific value may be determined based on a pilot pattern. For example, in the LTE protocol, when CDM4 is used, a quantity of REs occupied by an antenna port in one symbol in one RB may be 2. In NR, assuming that the resource unit is an RB, a density of the CSI-RS may be the same as that in LTE, in other words, equal to 1 RE/port/RB, or may be greater than 1 RE/port/RB. Then, the quantity of REs occupied by an antenna port in one symbol in one RB is equal to a frequency domain CDM value multiplied by the density. However, it may be understood that the quantity of REs occupied by one antenna port in one symbol does not exceed a quantity of subcarriers in one RB (for example, the quantity of subcarriers in one RB is 12). The value of a may be 2, 4, 8, or 12.

In conclusion, the value of the first parameter a may be at least one of {2, 4, 8, 12}.

It should be understood that the above-listed specific values of the first parameter a are described only as an example, or may be possible values provided in this embodiment of the present invention. However, this should not be constructed as any limitation on this embodiment of the present invention. Any method for generating a pilot sequence by defining the first parameter a to increase the sequence length shall fall within the protection scope of this application, and this application does not exclude a possibility that more values may be defined for the first parameter a in the future protocol.

Moreover, the first parameter a may have one value, or may have a plurality of values. The value or values may be statically configured, or may be semi-statically configured or dynamically configured.

Specifically, when the first parameter a has one value, the first parameter may be configured at least by using the following two methods:

Method 1: The first parameter a is preconfigured. Specifically, the value of the first parameter a may be stipulated in a protocol. The parameter may be configured for the network device and the terminal device respectively to generate a pilot sequence. In this case, it may be considered that the first parameter a is statically configured.

Alternatively, a defining rule of the first parameter a may be stipulated in a protocol, and the defining rule of the first parameter a is configured in the network device and the terminal device respectively, so that the network device and the terminal device determine the first parameter according to the same defining rule. For example, a mapping relationship between the first parameter and a CDM orthogonal code length may be defined in the protocol, and when the CDM orthogonal code length is determined, the corresponding first parameter a may be determined based on the foregoing mapping relationship. In this case, it may be considered that the first parameter a is semi-statically configured.

Method 2: The network device determines the first parameter a, and sends the first parameter a to the terminal device.

Specifically, the network device may determine the first parameter a based on factors such as the CDM orthogonal code length and a CSI-RS density, and notifies the terminal device of the first parameter a through signaling. In this case, the first parameter a may be semi-statically configured or dynamically configured.

Optionally, the network device sends a Radio Resource Control (RRC) message to the terminal device, and the RRC message carries the first parameter a.

Optionally, the network device sends a Media Access Control (MAC) control element (CE) to the terminal device, and the MAC-CE carries the first parameter a.

Optionally, the network device sends a physical downlink control channel (PDCCH) to the terminal device, and the PDCCH carries the first parameter a. Specifically, the first parameter may be carried in downlink control information (DCI) on the PDCCH.

It should be understood that the above-listed signaling used for sending the first parameter is described only as an example, and should not be constructed as any limitation on this embodiment of the present invention, and this embodiment of the present invention should not be limited thereto, either. Any signaling that can carry the first parameter should fall within the protection scope of this application.

When the first parameter a has a plurality of values, the first parameters a may be semi-statically configured or dynamically configured. In this case, the first parameters a may also be configured by using the foregoing methods.

Specifically, the plurality of first parameters a may be carried by using an RRC message, and then a first parameter a used in a current subframe is indicated by using DCI. It may be understood that, the currently used first parameter a is any one of the plurality of first parameters a.

After the first parameter a is determined, the network device may generate the first pilot sequence based on the first parameter a.

Specifically, the network device may generate the first pilot sequence by using any one of the following methods:

Method 1:

The network device may generate the first pilot sequence according to the following formula:

$$r_{l,n_s}(b) = g(b), \quad b = 0, 1, \ldots, N-1$$

where $N = f(a, N_{RB}^{max, DL})$, and $r_{l,n_s}(b)$ represents a value of a $b^{th}$ CSI-RS in an $l^{th}$ symbol in an $n_s^{th}$ slot, and the value may be a function $g(b)$ of b.

It may be learned that a sequence length of the first pilot sequence is N, and N is a function of the first parameter a and $N_{RB}^{max, DL}$. For example, $N = a \cdot N_{RB}^{max, DL}$, $N = 2a \cdot N_{RB}^{max, DL}$, and $N = a^2 \cdot N_{RB}^{max, DL}$, and for brevity, an example is not listed herein again. It should be understood that the above-listed f( ) form is described only as an example, and should not be constructed as any limitation on this embodiment of the present invention. All functions by using which the pilot sequence length N is determined based on the first parameter a, and the determined sequence length N is greater than the existing pilot sequence length $N_{RB}^{max, DL}$ may fall within the protection scope of this application.

For ease of understanding, a specific process of generating the first pilot sequence is described with reference to $r_{l,n_s}$ defined in the LTE protocol. In this embodiment of the present invention, the first pilot sequence is generated by using a PN sequence, and the PN sequence may be obtained by using the following formula (formula (2)):

$$r_{l,n_s}(b) = \frac{1}{\sqrt{2}}(1 - 2 \cdot c(2b)) + j\frac{1}{\sqrt{2}}(1 - 2 \cdot c(2b+1)),$$

$$b = 0, 1, \ldots, N-1$$

Definitions of c, b, and N in the formula are described above, and are not repeatedly described herein. In this embodiment of the present invention, a length of c is determined based on the sequence length N of the first pilot sequence, and may be, for example, twice the pilot sequence length N. $N_{ID}^{CSI}$ represents an identifier of a pilot sequence, and in this embodiment of the present invention, $N_{ID}^{CSI}$ may refer to a value in LTE or may be re-configured. $N_{CP}$ represents a cyclic prefix identifier, and in this embodiment of the present invention, $N_{CP}$ may refer to a value in LTE or may be re-configured.

For ease of understanding and description, the process of generating the first pilot sequence by the network device according to the formula (2) is described in detail below by using $N = a \cdot N_{RB}^{max, DL}$ as an example with reference to the above-listed values of the first parameter a. $N_{RB}^{max, DL}$ may be a maximum quantity of resource units included in a downlink bandwidth. For example, $N_{RB}^{max, DL}$ may be a maximum quantity of RBs included in a downlink bandwidth in the existing LTE protocol, and $N_{RB}^{max, DL} = 110$.

It is assumed that the first parameter a is a quantity of REs in one symbol in one RB. In LTE, the quantity of REs in one symbol in one RB, namely, $a = 12$, so that the sequence length N of the first pilot sequence is equal to 1320, and $b = 0, 1, \ldots, 1319$. 1320 sequence elements, in other words, $r_{l,n_s}(0), r_{l,n_s}(1), \ldots, r_{l,n_s}(1319)$, may be obtained by traversing a range of [0, 1319] for the value of a, each value of b corresponds to a sequence element, and each sequence element may be understood as a value of a CSI-RS.

For example, when $b = 0$, $$r_{l,n_s}(0) = \frac{1}{\sqrt{2}}(1 - 2 \cdot c(2 \times 0)) + j\frac{1}{\sqrt{2}}(1 - 2 \cdot c(2 \times 0 + 1));$$

and $r_{l,n_s}(1) = \frac{1}{\sqrt{2}}(1 - 2 \cdot c(2 \times 1)) + j\frac{1}{\sqrt{2}}(1 - 2 \cdot c(2 \times 1 + 1)).$ when $b = 1$, By analogy, 220 sequence elements may be obtained. For brevity, the sequence elements are not listed one by one herein.

Assuming that the first parameter a is at least one of 2, 4, 8, or 12, and using $a = 2$ as an example, the sequence length N of the first pilot sequence is equal to 220, and $b = 0, 1, \ldots, 219$. The 220 sequence elements, namely, $r_{l,n_s}(0), r_{l,n_s}(1), \ldots, r_{l,n_s}(219)$ may be obtained by traversing a range of [0, 219] for the value of a. Each value of b corresponds to a sequence element, and each sequence element may be understood as a value of a CSI-RS.

It is assumed that the first parameter a is a length of an orthogonal code used by an antenna port during frequency domain CDM. Because in NR, CSI-RSs are configured in a same symbol, used CDM is frequency domain CDM. In LTE, CDM2 and CDM4 are defined. Using $a = 4$ as an example, the sequence length N of the first pilot sequence is equal to 440, and $b = 0, 1, \ldots, 439$. 440 sequence elements, namely, $r_{l,n_s}(0), r_{l,n_s}(1), \ldots, r_{l,n_s}(439)$, may be obtained by traversing a range of [0, 439] for the value of a. Each value of b corresponds to a sequence element, and each sequence element may be understood as a value of a CSI-RS.

The formula (2) in Method 1 is similar to a PN sequence generation formula defined in the existing LTE protocol and therefore is very much compatible with the prior art, and in addition, a sequence length is increased and correlation between pilot sequences is reduced.

Method 2:

The network device may generate the first pilot sequence according to the following formula:

$$r_{l,n_s}(m,n) = h(m,n), \quad m = 0, 1, \ldots, N_{RB}^{max, DL} - 1, \quad n = 0, 1, \ldots, a-1$$

where $N = f(a, N_{RB}^{max, DL})$, and $r_{l,n_s}(b)$ represents a value of an $n^{th}$ CSI-RS in an $m^{th}$ resource unit in an $l^{th}$ symbol in an $n_s^{th}$ slot, and the value may be a function $h(m, n)$ of m and n. The sequence length N of the first pilot sequence may be the same as the sequence length defined in Method 1, and for brevity, details are not described herein again.

For ease of understanding, a specific process of generating the first pilot sequence is described with reference to $r_{l,n_s}$ defined in the LTE protocol. In this embodiment of the present invention, the first pilot sequence is generated by using a PN sequence, and the PN sequence may be obtained by using the following formula (formula (3)):

$$r_{l,n_s}(m, n) = \frac{1}{\sqrt{2}}(1 - 2 \cdot c(2(ma+n))) + j\frac{1}{\sqrt{2}}(1 - 2 \cdot c(2(ma+n)+1)),$$

$$m = 0, 1, \ldots, N_{RB}^{max, DL} - 1$$

Definitions of c, m, n, and N in the formula are described above, and are not repeatedly described herein.

In Method 2, because a number m of the resource unit is substituted into the PN sequence generation formula (in other words, the formula (3)), sequence elements in each resource unit are more specifically limited.

For ease of understanding, the process of generating the first pilot sequence by the network device according to the formula (3) is described in detail below still by using $N = a \cdot N_{RB}^{max, DL}$ as an example with reference to the above-listed values of the first parameter a. $N_{RB}^{max, DL}$ may be a maximum quantity of resource units included in a downlink bandwidth. For example, $N_{RB}^{max, DL}$ may be a maximum quantity of RBs included in a downlink bandwidth in the existing LTE protocol, and $N_{RB}^{max, DL} = 110$.

It is assumed that the first parameter a is a quantity of REs in one symbol in one RB. In LTE, the quantity of REs in one symbol in one RB, namely, $a = 12$, so that the sequence length N of the first pilot sequence is equal to 1320, and $b = 0, 1, \ldots, 1319$. A value of m is $0, 1, \ldots,$ or $N_{RB}^{max, DL} - 1$, in other words, a range of [0, 109] is traversed for the value of m. Because the sequence length $N = a \cdot N_{RB}^{max, DL}$, a value of n is $0, 1, \ldots,$ or $a-1$, in other words, a range of [0, 11] is traversed for the value of n. In other words, each time a value is selected for m, the range of [0, 11] is traversed for n.

For example, when $m = 0$, $n = 0, 1, \ldots,$ or 11.

$$r_{l,n_s}(0, 0) = \frac{1}{\sqrt{2}}(1 - 2 \cdot c(2(12 \times 0 + 0))) + j\frac{1}{\sqrt{2}}(1 - 2 \cdot c(2(12 \times 0 + 0) + 1))$$

$$r_{l,n_s}(0, 1) = \frac{1}{\sqrt{2}}(1 - 2 \cdot c(2(12 \times 0 + 1))) + j\frac{1}{\sqrt{2}}(1 - 2 \cdot c(2(12 \times 0 + 1) + 1))$$

By analogy, 12 sequence elements may be obtained when $m = 0$. For brevity, the sequence elements are not listed one by one herein. Then, when $m = 1, 2, \ldots,$ or 109, the range of [0, 11] is traversed for the value of n, and 12 sequence elements may be obtained. When the first parameter a has different values, the network device may still generate corresponding sequence elements according to the foregoing method. For brevity, examples are not described herein one by one.

In other words, each value of m corresponds to a resource unit, and when the value of m is given, each value of n corresponds to a sequence element in an RB. A difference between the formula (3) in Method 2 and the formula (2) in Method 1 lies in that an RE onto which each sequence element is mapped is limited in more dimensions.

It should be noted that although the formulas for generating the first pilot sequence in Method 1 and Method 2 are different, when the first parameter is given, sequence elements of pilot sequences generated according to Method 1 and Method 2 are the same, and sequence lengths of the pilot sequences are also the same. The pilot sequences are obtained by using different calculation methods of Method 1 and Method 2. In addition, this embodiment of the present invention does not exclude a possibility that the first pilot sequence may be generated by using another possible formula, so that an obtained pilot sequence length is greater than a pilot sequence length in the prior art.

S320. The network device determines a plurality of REs used to carry a first CSI-RS, and values of the first CSI-RS are selected from the first pilot sequence.

It should be noted that the network device may send, by using a plurality of antenna ports, CSI-RSs to one or more terminal devices for channel measurement. When sending the plurality of CSI-RSs, the network device may determine values of the CSI-RSs in the generated first pilot sequence, map the values onto a time-frequency resource, load the values by using a multiplex code to distinguish between antenna ports, and finally send the plurality of CSI-RSs together by using the time-frequency resource. In this embodiment of the present invention, for ease of distinguishing and description, a specific process of sending a CSI-RS by the network device is described in detail by using the CSI-RS (for example, denoted as the first CSI-RS) that is sent by the network device by using a first antenna port as an example. However, this should not be constructed as any limitation on this embodiment of the present invention, and it does not mean that the plurality of REs on which the first CSI-RS is located are used to send the first CSI-RS only, and the plurality of REs used to carry the first CSI-RS can also carry a CSI-RS of another antenna port, for example, a CSI-RS (for example, denoted as a second CSI-RS) of a second antenna port. It may be understood that, values of the first CSI-RS and the second CSI-RS carried on a same RE are selected from a same sequence element in the first pilot sequence, in other words, values of the first CSI-RS and the second CSI-RS carried on a same RE may be the same. The first CSI-RS and the second CSI-RS that have a same value may be multiplexed on a same time-frequency resource through code division. Moreover, the first CSI-RS and the second CSI-RS may be CSI-RSs sent to a same terminal device, or may be CSI-RSs sent to different terminal devices. This is not particularly limited in this embodiment of the present invention.

Herein, without loss of generality, this embodiment of the present invention is described in detail by using the process of sending the first CSI-RS by the network device as an example. It may be understood that a specific process of sending CSI-RSs by the network device by using different antenna ports is the same as the specific process of sending the first CSI-RS by the network device.

After generating the first pilot sequence in S310, the network device may determine a currently used pilot pattern based on the first parameter of the CSI-RS, determine the plurality of REs used to carry the first CSI-RS based on a mapping relationship between sequence elements and REs in the pilot pattern, and map some or all sequence elements in the first pilot sequence (in other words, the plurality of values of the first CSI-RS) onto the plurality of REs.

It should be noted that, the method for generating the first pilot sequence by the network device may be the method of S310 described above in this embodiment of the present invention, or may refer to a pilot sequence generation method in the prior art, and S310 is used as an optional step. In other words, a possible implementation for generating the first pilot sequence should not be constructed as any limitation on this embodiment of the present invention, and this embodiment of the present invention should not be limited thereto, either.

In this embodiment of the present invention, if the first pilot sequence is obtained through step S310, a mapping relationship between a sequence element and an RE may be reflected by using the mapping relationship between b and an RE in S310, or the mapping relationship between m, n and an RE. For example, a $b^{th}$ sequence element is mapped onto an RE in a resource unit, or an $n^{th}$ sequence element in an $m^{th}$ resource unit is mapped onto an RE in the $m^{th}$ resource unit.

It should be noted that, the pilot pattern and the mapping relationship between a sequence element and an RE may be preconfigured, or the mapping relationship may be determined by referring to a mapping rule between a pilot element and an RE in the prior art. The pilot pattern and the mapping relationship between a sequence element and an RE are not particularly limited in this embodiment of the present invention.

In this embodiment of the present invention, the plurality of REs used to carry the first CSI-RS may be distributed in a plurality of resource units. In each resource unit, a plurality of REs used to carry the first CSI-RS are located on a plurality of subcarriers in a same symbol. Moreover, in the plurality of REs in the same resource unit, values of the first CSI-RS carried on at least two REs are different, and the values of the first CSI-RS may be loaded to the plurality of REs in the resource unit by using a first multiplex code (for ease of distinguishing, a multiplex code corresponding to the first antenna port is denoted as the first multiplex code).

In other words, for each resource unit, the network device may select at least two different sequence elements from the first pilot sequence generated in S310 and map the sequence elements onto REs. Therefore, a sequence length of the first CSI-RS in each symbol in each resource unit is greater than or equal to 2.

A quantity of a plurality of subcarriers that are in a same symbol and on which the plurality of REs used to carry the first CSI-RS in each resource unit are located is a quantity of REs occupied by the first CSI-RS in the resource unit. Optionally, the quantity of the plurality of subcarriers that are in the same symbol and on which the plurality of REs used to carry the first CSI-RS in the resource unit are located may be any value in {2, 4, 8, 12}. In other words, in each resource unit, the quantity of REs occupied by the first CSI-RS may be 2, 4, 8, or 12. However, it should be noted that this does not mean that the sequence length of the first CSI-RS in each resource unit is 2, 4, 8, or 12. The sequence length of the first CSI-RS needs to be defined based on a quantity of different sequence elements in the resource unit. It should be understood that, the plurality of REs in each resource unit may be continuous or discontinuous in frequency domain. This is not particularly limited in this embodiment of the present invention.

Optionally, the values of the first CSI-RS carried on the plurality of REs in each resource unit are different from each other.

In other words, values of the first CSI-RS carried on any two of the plurality of REs in each resource unit are different.

In other words, if the values of the first CSI-RS carried on the plurality of REs in each resource unit are different from each other, and the first CSI-RS occupies s (s≥2, and s is a natural number) REs in the resource unit, a sequence length of the first CSI-RS in the resource unit is s.

For example, if the first CSI-RS occupies 12 REs in each RB (in other words, an example of the resource unit), and values of the first CSI-RS carried on the 12 REs are different from each other, the first CSI-RS fully occupies 12 subcarriers in a symbol. Corresponding to the formula (2) described above, the network device selects 12 different values for b (specific values of b may be determined based on a predefined mapping relationship between a sequence element and an RE), and obtains 12 different sequence elements. Alternatively, corresponding to the formula (3) described above, the network device may determine the value of m based on a number of a current RB, traverse the range of [0, 11] for the value of n, and obtain 12 different sequence elements. The network device maps the 12 sequence elements one by one onto 12 subcarriers in a same symbol based on the predefined mapping relationship. In this case, the first CSI-RS and another CSI-RS (for example, the second CSI-RS) may implement code division multiplexing by using 6 sets of OCC codes having a length of 2.

For another example, if the first CSI-RS occupies two REs in each RB, values of the first CSI-RS carried on the two REs are definitely different, and then the first CSI-RS occupies two subcarriers in a symbol. It should be noted that the first CSI-RS occupies two REs in each RB. This does not mean that the value of the first parameter a of the first pilot sequence is 2, and the first parameter a may be 2 or may be a natural number greater than 2.

For ease of understanding this embodiment of the present invention, the following describes correspondences between different antenna port quantities and pilot patterns with reference to the accompanying drawings.

Assuming that an antenna port quantity is 2, the network device determines that a CSI-RS corresponding to each antenna port may occupy two REs in each RB (namely, an example of the resource unit).

Figure 4:
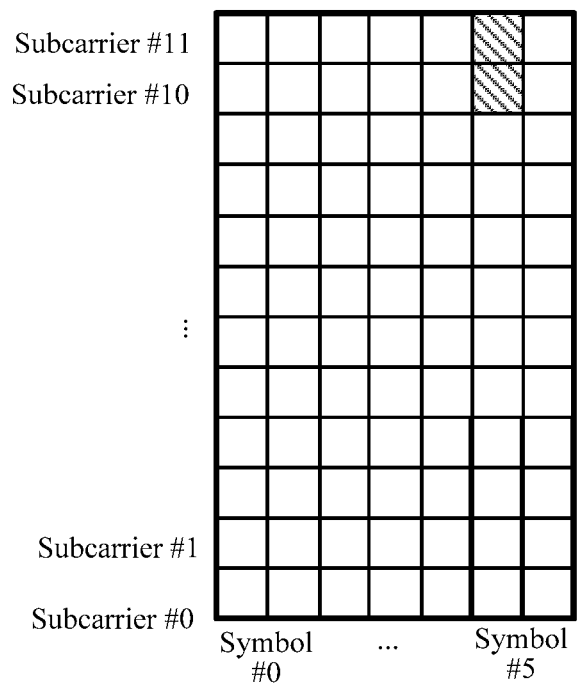
FIG. 4 is a schematic diagram of a pilot pattern according to an embodiment of the present invention.
Figure 5:
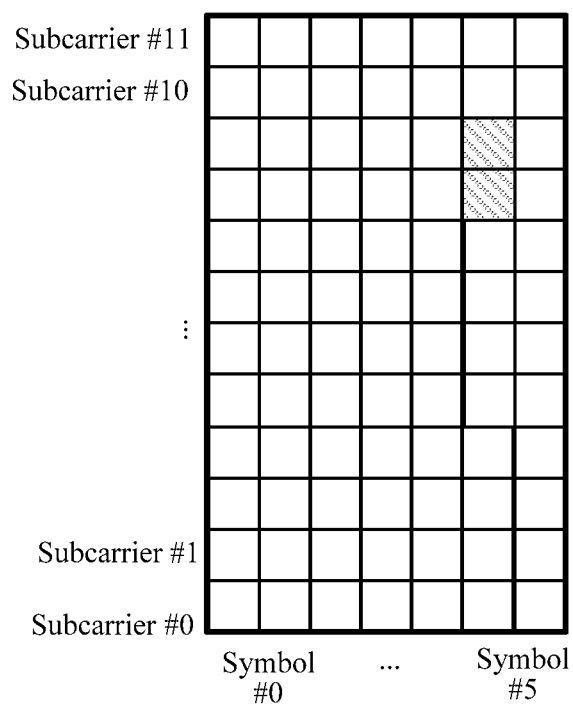
FIG. 5 is another schematic diagram of a pilot pattern according to an embodiment of the present invention.

FIG. 4 and FIG. 5 are schematic diagrams of pilot patterns according to an embodiment of the present invention. Specifically, FIG. 4 and FIG. 5 show possible pilot patterns of CSI-RSs when an antenna port quantity is 2. As shown in FIG. 4, two REs used to carry a first CSI-RS may be distributed in a same symbol. For example, two REs used to carry the first CSI-RS shown in the figure are located in a symbol #5, and the two REs are located on a subcarrier #10 and a subcarrier #11. As shown in FIG. 5, the two REs used to carry the first CSI-RS may be distributed in a same symbol, for example, the symbol #5 shown in the figure, and the two REs are located on a subcarrier #8 and a subcarrier #9. By analogy, the two REs used to carry the first CSI-RS may be located on any two subcarriers located in a same symbol, for example, a subcarrier #6 and a subcarrier #7, and a subcarrier #4 and a subcarrier #5 which are not shown in the figure. Moreover, the CSI-RSs at the two antenna ports may be distinguished by using a multiplex code, in other words, frequency domain CDM is implemented.

As to a first pilot sequence, values of the first CSI-RS carried on the two REs correspond to different values of b in the formula (2), or correspond to different values of m and n in the formula (3).

If a=2, corresponding to the formula (2) described above, the network device selects two different values for b (specific values of b may be determined based on a predefined mapping relationship between a sequence element and an RE), and obtains two different sequence elements. Alternatively, corresponding to the formula (3) described above, the network device may determine the value of m based on a number of a current RB, select values 0 and 1 for n, and obtain two different sequence elements. The network device maps the two sequence elements one by one onto two subcarriers in a same symbol based on the predefined mapping relationship.

If a=12, corresponding to the formula (2) described above, the network device selects two different values for b (specific values of b may be determined based on a predefined mapping relationship between a sequence element and an RE). For example, the network device may select a value based on a number of a subcarrier of an occupied RE, and obtain two different sequence elements. Alternatively, corresponding to the formula (3) described above, the network device may determine the value of m based on a number of a current RB, and select two values for n from [0, 11]. For example, the network device may select a value based on a number of a subcarrier of an occupied RE, and obtain two different sequence elements. The network device maps the two sequence elements one by one onto two subcarriers in a same symbol based on the predefined mapping relationship.

If a=4 or 8, corresponding to the formula (2) described above, the network device selects two different values for b (specific values of b may be determined based on a predefined mapping relationship between a sequence element and an RE), and obtains two different sequence elements. Alternatively, corresponding to the formula (3) described above, the network device may determine the value of m based on a number of a current RB, select two values, for example, select any two values, for n from [0, 3] or [0, 7], and obtain two different sequence elements. The network device maps the two sequence elements one by one onto two subcarriers in a same symbol based on the predefined mapping relationship.

Assuming that the antenna port quantity is 4, the network device determines that a CSI-RS corresponding to each antenna port may occupy two REs in each RB (namely, an example of the resource unit) when CDM2 is used, and may occupy four REs when CDM4 is used.

Figure 6:
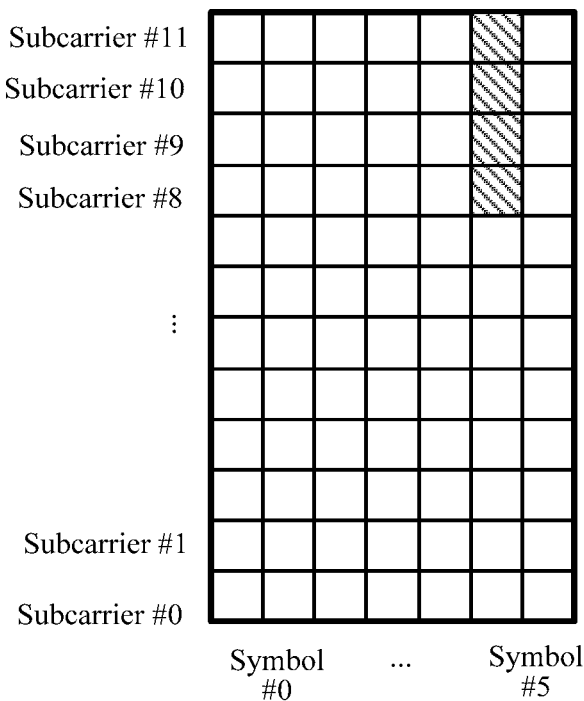
FIG. 6 is still another schematic diagram of a pilot pattern according to an embodiment of the present invention.
Figure 7:
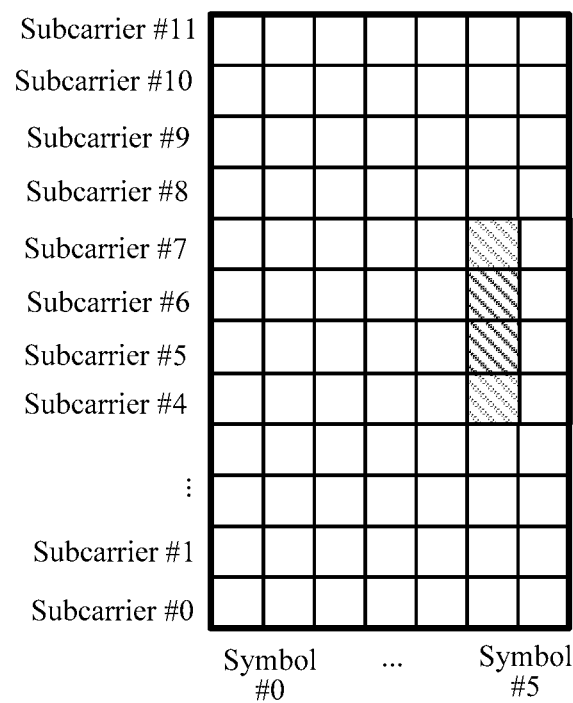
FIG. 7 is yet another schematic diagram of a pilot pattern according to an embodiment of the present invention.

FIG. 6 and FIG. 7 are other schematic diagrams of pilot patterns according to an embodiment of the present invention. Specifically, FIG. 6 and FIG. 7 show possible pilot patterns of CSI-RSs when an antenna port quantity is 4. As shown in FIG. 6, four REs used to carry a first CSI-RS may be distributed in a same symbol. For example, four REs used to carry the first CSI-RS shown in the figure are located in a symbol #5, and the four REs are located on a subcarrier #8 to a subcarrier #11. As shown in FIG. 7, the four REs used to carry the first CSI-RS may be distributed in a same symbol, for example, the symbol #5 shown in the figure, and the four REs are located on a subcarrier #4 to a subcarrier #7. By analogy, the four REs used to carry the first CSI-RS may be located on a subcarrier #0 to a subcarrier #3 in a same symbol, which is not shown in the figure. Moreover, the CSI-RSs at the four antenna ports may be distinguished by using a multiplex code, in other words, frequency domain CDM is implemented.

When a quantity of REs used to carry the first CSI-RS in each resource unit is greater than 2, at least two of the plurality of REs carry different values of the first CSI-RS. Therefore, when the values are selected from a first pilot sequence for the first CSI-RS, two different values of b (corresponding to the formula (2)), or two sets of different values of (m, n) (corresponding to the formula (3)) may be selected. In the two sets of different values of (m, n) corresponding to the formula (3), for a determined resource unit, the value of m is given, and two different values are selected for n. The specific process of selecting two different values from the first pilot sequence to generate the first CSI-RS has been described in detail above with reference to the example in which the antenna port quantity is 2. For brevity, details are not described herein again.

It should be understood that, the correspondences between the above-listed antenna port quantities and the pilot patterns and the schematic diagrams of the pilot patterns shown in the accompanying drawings are merely described as an example for ease of understanding, and should not be constructed as any limitation on this embodiment of the present invention. When the antenna port quantity is increased, for example, the antenna port quantity is 8, twice CDM4 resources or fourfold CDM2 resources may also be considered to be used, to implement frequency division multiplexing. Regardless of how the pilot pattern is configured, provided that at least two of the plurality of REs occupied by the first CSI-RS in one symbol in one resource unit carry different values of the CSI-RS, the configuration shall fall within the protection scope of this embodiment of the present invention.

As described above, the network device may send a plurality of CSI-RSs by using a plurality of antenna ports, and the plurality of CSI-RSs may be multiplexed on a time-frequency resource through frequency division CDM.

Optionally, in each resource unit, the plurality of REs used to carry the first CSI-RS carry a second CSI-RS, at least two of the plurality of REs used to carry the second CSI-RS carry different values of the second CSI-RS, and the values of the second CSI-RS are loaded to the plurality of REs by using a second multiplex code (for ease of distinguishing and description, a multiplex code corresponding to the second antenna port is denoted as the second multiplex code).

When the first CSI-RS and the second CSI-RS occupy a same RE, in a same resource unit, a value of the first CSI-RS on an $i^{th}$ (j>i≥0, i is an integer, and j indicates a quantity of subcarriers in a resource unit) RE and a value of the second CSI-RS on the $i^{th}$ RE are the same. In this case, the values may be distinguished by using different multiplex codes.

Optionally, the multiplex code may be a CDM code, for example, an OCC code.

The network device may distinguish between CSI-RSs at different antenna ports through CDM. In other words, sequence elements configured on a same time-frequency resource (for example, an RE) are distinguished by using the CDM code. Values of the CSI-RSs configured on a same RE may be the same, but CDM codes corresponding to different antenna ports may be different.

Using two antenna ports as an example, the OCC code may be two bits. The network device may distinguish between the two antenna ports by using different OCC codes. For example, corresponding to an antenna port (port) #15, a used OCC code may be [1, 1]; and corresponding to an antenna port (port) #16, a used OCC code may be [1, −1]. Therefore, although REs occupied by CSI-RSs at the port #15 and the port #16 are the same and values of the CSI-RSs are the same, OCC codes are different, and the two CSI-RSs may be orthogonal to each other by loading an orthogonal code, to avoid interference between each other.

S330. The network device sends the first CSI-RS to a terminal device by using the plurality of REs.

When the network device sends the first CSI-RS to the terminal device by using the plurality of REs, the resource unit is used as a minimum unit for transmission, and in a same resource unit, other data different from the first CSI-RS may further be carried. Therefore, in S340, the terminal device receives signals sent by the network device, and the signals include a first CSI-RS.

In addition, when two network devices send CSI-RSs by using a same time-frequency resource and a same multiplex code, because a sequence length of the CSI-RS in each resource unit is increased from 1 to at least 2, correlation between sequences is reduced and interference between the two CSI-RSs is reduced.

S340. The terminal device receives, on a plurality of resource units, signals sent by the network device, where the signals include a first CSI-RS.

The terminal device may determine, with reference to the methods described in S310 and S320, the plurality of REs used to carry the first CSI-RS from the network device.

Optionally, the method 300 further includes: receiving, by the terminal device, a configuration parameter sent by the network device, where the configuration parameter is used to determine the plurality of REs carrying the first CSI-RS.

Specifically, when sending the first CSI-RS to the terminal device, the network device may send the configuration parameter to the terminal device, and the first parameter may include: for example, an antenna port quantity, a CSI-RS sending period, a system frame number, a number of a symbol carrying the CSI-RS, a number of a resource unit (for example, an RB) carrying the first CSI-RS, a CDM value, and a pilot density. The terminal device may determine, based on the first parameter, the plurality of REs used to carry the first CSI-RS.

S350. The terminal device determines the plurality of resource elements REs used to carry the first CSI-RS, and obtain the first CSI-RS from the plurality of REs.

The terminal device determines, in S350, the plurality of REs carrying the first CSI-RS, so that the terminal device can obtain the first CSI-RS from the signals received in S340.

It may be understood by a person skilled in the art that, the first CSI-RS sent by the network device may be x, and the network device sends the first CSI-RS to the terminal device through a channel by using the plurality of REs. Therefore, the signals received by the terminal device may be y. A relationship between the vector x of the first CSI-RS sent by the network device and the vector y of signal received by the terminal device may be represented as follows:

$$y = Hx + n$$

where H represents a channel matrix, and n represents receiver noise. It may be learned that the receiver noise n causes impact on signal receiving. In this embodiment of the present invention, for ease of description, it is assumed that the receiver noise is zero and a signal is correctly transmitted. In the prior art, there are a plurality of solutions that can be used to eliminate the noise. For brevity, a description of same or similar cases is omitted below.

Optionally, the method 300 further includes: generating, by the terminal device, a third CSI-RS.

In this embodiment of the present invention, for ease of distinguishing and description, the CSI-RS generated by the terminal device is denoted as the third CSI-RS.

It should be understood that, the terminal device may first generate a second pilot sequence based on the first parameter, and then determine a value of the third CSI-RS based on the above-described mapping relationship between a sequence element and an RE in the pilot pattern, and the plurality of REs for the first CSI-RS determined in S340, to obtain the third CSI-RS. It should be understood that, a specific process of generating the third CSI-RS by the terminal device is similar to the specific processes of generating the first pilot sequence by the network device based on the first parameter and determining the plurality of REs used to carry the first CSI-RS in S310 and S320. For brevity, details are not described herein again.

Moreover, because first parameters used by the network device and the terminal device are the same, formulas used to generate the pilot sequence are the same, and mapping relationships between a sequence element and an RE are the same, the third CSI-RS generated by the terminal device is the same as the first CSI-RS generated by the network device, in other words, the third CSI-RS may be represented as the vector x.

Optionally, the method 300 further includes: estimating, by the terminal device, a channel matrix based on the received first CSI-RS and the generated third CSI-RS.

It can be learned from the description of S350 that the first CSI-RS received by the terminal device may be y, and the third CSI-RS generated by the terminal device based on the first parameter may be x. Therefore, an estimated value of H may be solved according to $$y = Hx + n.$$

The terminal device can estimate the channel matrix by using the foregoing steps, to determine a precoding matrix for data transmission.

Therefore, in this embodiment of the present invention, in a plurality of REs used to carry CSI-RSs at antenna ports, at least two REs in each resource unit have different CSI-RS values, in other words, a sequence length of a CSI-RS at each antenna port in each symbol in each resource unit is increased, correlation between pilot sequences is reduced, and interference between the CSI-RSs is reduced, thereby facilitating more accurate channel estimation.

It should be understood that, details of the reference signal sending method and the reference signal receiving method according to the embodiments of the present invention are described in the foregoing embodiments by using a PN sequence as an example. However, this should not be constructed as any limitation on this embodiment of the present invention. This application does not exclude a possibility of generating a pilot sequence by using another sequence, for example, a ZC sequence, in a future protocol either. The reference signal sending method and the reference signal receiving method according to the embodiments of the present invention are also applicable to other sequences, to increase a sequence length and reduce correlation between pilot sequences. For brevity, other sequences are not described one by one herein as an example.

It should be understood that sequence numbers of the processes do not mean execution sequences in the foregoing embodiments. The execution sequences of the processes should be determined according to functions and internal logic of the processes, and should not be constructed as any limitation on the implementation processes of embodiments of this application.

The foregoing describes the reference signal sending method and the reference signal receiving method in the embodiments of the present invention in detail with reference to FIG. 3 to FIG. 7. The following describes the network device and the terminal device in the embodiments of the present invention in detail with reference to FIG. 8 to FIG. 11.

Figure 8:
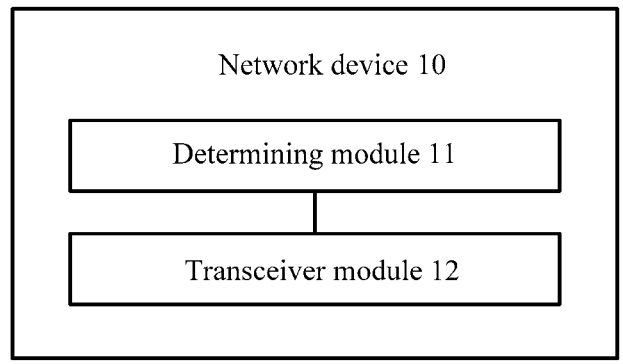
FIG. 8 is a schematic block diagram of a network device according to an embodiment of the present invention.

FIG. 8 is a schematic block diagram of a network device 10 according to an embodiment of the present invention. As shown in FIG. 8, the network device 10 includes a determining module 11 and a transceiver module 12.

The determining module 11 is configured to determine a plurality of resource elements REs used to carry a first CSI-RS, where the plurality of REs are distributed in a plurality of resource units. In each resource unit, a plurality of REs used to carry the first CSI-RS are located on a plurality of subcarriers in a same symbol, values of the first CSI-RS carried on at least two REs are different, and values of the first CSI-RS are loaded to the plurality of REs in the resource unit by using a first multiplex code.

The transceiver 12 is configured to send the first CSI-RS to a terminal device by using the plurality of REs.

Optionally, in each resource unit, a quantity of the plurality of subcarriers in the same symbol is at least one of {2, 4, 8, 12}.

Optionally, the values of the first CSI-RS carried on the plurality of REs in each resource unit are different from each other.

Optionally, the plurality of REs carry a second CSI-RS, values of the second CSI-RS carried on at least two REs are different, and values of the second CSI-RS are loaded to the plurality of REs by using a second multiplex code.

Optionally, the values of the first CSI-RS are calculated by using the following formula:

$$r_{l,n_s}(b)=g(b), b=0,1\ldots,N-1$$

where $N=f(a, N_{RB}^{max, DL})$ a is a first parameter, $N_{RB}^{max, DL}$ represents a maximum quantity of resource units included on a downlink channel, and $r_{l,n_s}(b)$ represents a value of a $b^{th}$ CSI-RS in an $l^{th}$ symbol in an $n_s^{th}$ slot.

Optionally, the values of the first CSI-RS are calculated by using the following formula:

$$r_{l,n_s}(m,n)=h(m,n), m=0,1,\ldots,N_{RB}^{max,DL}-1, n=0, 1,\ldots,a-1$$

where a is a first parameter, $N_{RB}^{max, DL}$ represents a maximum quantity of resource units included on a downlink channel, and $r_{l,n_s}(m,n)$ represents a value of an $n^{th}$ CSI-RS in an $m^{th}$ resource unit in an $l^{th}$ symbol in an $n_s^{th}$ slot.

Optionally, a value of the first parameter a includes at least one of the following: a quantity of REs in one symbol in one resource unit; a length of an orthogonal code used by a CSI-RS port during frequency domain code division multiplexing; or a quantity of REs occupied by a CSI-RS port in one symbol in one resource unit.

Optionally, the value of the first parameter a includes at least one of {2, 4, 8, 12}.

Optionally, the first parameter a is preconfigured.

Optionally, the first parameter a is sent to the terminal device after being determined by the network device.

It should be understood that, the network device 10 may correspond to the network device in the reference signal sending or reference signal receiving method 300 according to embodiments of the present invention, and the network device 10 may include modules configured to perform the method performed by the network device in the reference signal sending or reference signal receiving method 300 in FIG. 3. Moreover, the various modules in the network device 10 and other operations and/or functions described above are for the purpose of implementing a corresponding procedure of the reference signal sending or reference signal receiving method 300 in FIG. 3. Specifically, the determining module 11 may be configured to perform S310 and S320 in the method 300, and the transceiver module 12 may be configured to perform S330 in the method 300. Exemplary processes of performing the foregoing corresponding steps by the various modules have been described in detail in the method 300, and for brevity, details are not described herein again.

Figure 9:
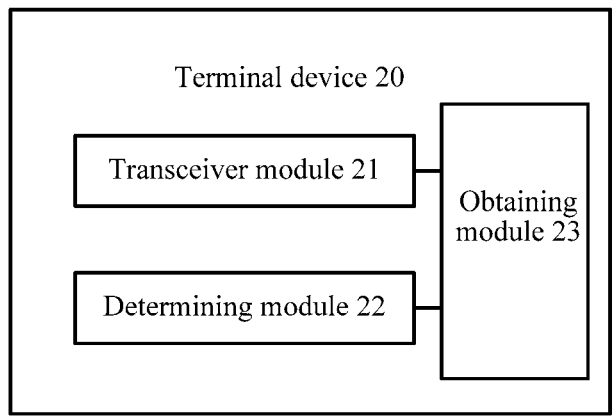
FIG. 9 is a schematic block diagram of a terminal device according to an embodiment of the present invention.

FIG. 9 is a schematic block diagram of a terminal device 20 according to an embodiment of the present invention. As shown in FIG. 9, the terminal device 20 includes a transceiver module 21, a determining module 22, and an obtaining module 23.

The transceiver module 21 is configured to receive, on a plurality of resource units, signals sent by a network device, where the signals include a first CSI-RS.

The determining module 22 is configured to determine a plurality of resource elements REs used to carry the first CSI-RS, where the plurality of REs are distributed in a plurality of resource units, and in each resource unit, a plurality of REs used to carry the first CSI-RS are located on a plurality of subcarriers in a same symbol, values of the first CSI-RS carried on at least two REs are different, and values of the first CSI-RS are loaded to the plurality of REs in the resource unit by using a first multiplex code.

The obtaining module 23 is configured to obtain the first CSI-RS on the plurality of REs.

Optionally, in each resource unit, a quantity of the plurality of subcarriers in the same symbol is at least one of {2, 4, 8, 12}.

Optionally, the values of the first CSI-RS carried on the plurality of REs are different from each other. Optionally, the values of the first CSI-RS are calculated by using the following formula:

$$r_{l,n_s}(b)=g(b), b=0,1\ldots,N-1$$

where $N=f(a, N_{RB}^{max, DL})$ a is a first parameter, $N_{RB}^{max, DL}$ represents a maximum quantity of resource units included on a downlink channel, and $r_{l,n_s}(b)$ represents a value of a $b^{th}$ CSI-RS in an $l^{th}$ symbol in an $n_s^{th}$ slot.

Optionally, the values of the first CSI-RS are calculated by using the following formula:

$$r_{l,n_s}(m,n)=h(m,n), m=0,1,\ldots,N_{RB}^{max,DL}-1, n=0, 1,\ldots,a-1$$

where a is a first parameter, $N_{RB}^{max, DL}$ represents a maximum quantity of resource units included on a downlink channel, and $r_{l,n_s}(m,n)$ represents a value of an $n^{th}$ CSI-RS in an $m^{th}$ resource unit in an $l^{th}$ symbol in an $n_s^{th}$ slot.

Optionally, a value of the first parameter a includes at least one of the following: a quantity of REs in one symbol in one resource unit; a length of an orthogonal code used by a CSI-RS port during frequency domain code division multiplexing; or a quantity of REs occupied by a CSI-RS port in one symbol in one resource unit.

Optionally, the first parameter a is predetermined by the network device or the terminal device.

Optionally, the first parameter a is sent to the terminal device after being determined by the network device.

It should be understood that, the terminal device 20 may correspond to the terminal device in the reference signal sending or reference signal receiving method 300 according to the embodiments of the present invention, and the terminal device 20 may include modules configured to perform the method performed by the terminal device in the reference signal sending or reference signal receiving method 300 in FIG. 3. Moreover, the various modules in the terminal device 20 and other operations and/or functions described above are for the purpose of implementing a corresponding procedure of the reference signal sending or reference signal receiving method 300 in FIG. 3. Specifically, the transceiver module 21 may be configured to perform S340 in the method 300, and the determining module 22 and the obtaining module 23 may be configured to perform S350 in the method 300. Exemplary processes of performing the foregoing corresponding steps by the various modules have been described in detail in the method 300, and for brevity, details are not described herein again.

Figure 10:
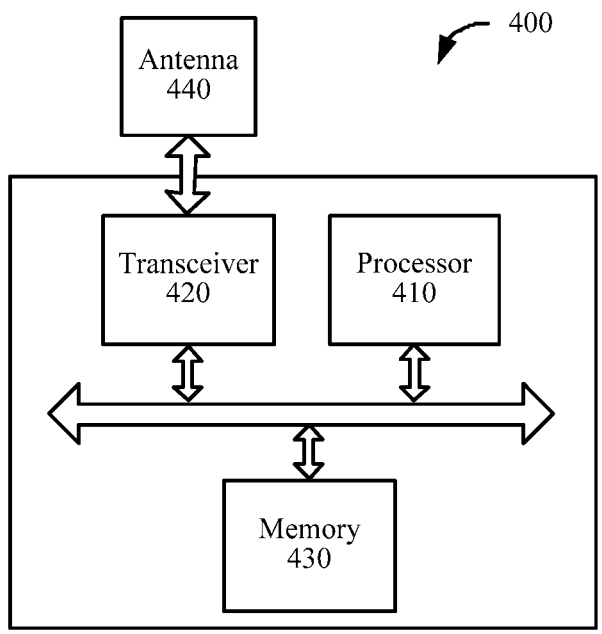
FIG. 10 is another schematic block diagram of a network device according to an embodiment of the present invention.

FIG. 10 is another schematic block diagram of a network device 400 according to an embodiment of the present invention. As shown in FIG. 10, the network device 400 includes a processor 410 and a transceiver 420, and optionally, the network device 400 further includes a memory 430. The processor 410, the transceiver 420, and the memory 430 communicate with each other by using an internally connected channel to transmit a control and/or data signal, the memory 430 is configured to store a computer program, and the processor 410 is configured to invoke the computer program from the memory 430 and run the computer program, to control the transceiver 420 to receive or send a signal. When the computer program stored in the memory 430 is executed by the processor 410, the processor 410 is configured to determine a plurality of resource elements REs used to carry a first CSI-RS, where the plurality of REs are distributed in a plurality of resource units, and in each resource unit, a plurality of REs used to carry the first CSI-RS are located on a plurality of subcarriers in a same symbol, values of the first CSI-RS carried on at least two REs are different, and values of the first CSI-RS are loaded to the plurality of REs in the resource unit by using a first multiplex code; and the transceiver 420 is configured to send the first CSI-RS to a terminal device by using the plurality of REs.

The processor 410 and the memory 430 may be combined into one processing apparatus, and the processor 410 is configured to execute the computer program stored in the memory 430 to implement the foregoing functions. In an exemplary implementation, the memory 430 may be integrated into the processor 410, or independent of the processor 410.

The network device may further include an antenna 440, configured to send, by using a radio signal, downlink data or downlink control signaling output by the transceiver 420. Specifically, the network device 400 may correspond to the network device in the reference signal sending or reference signal receiving method 300 according to embodiments of the present invention, and the network device 400 may include units configured to perform operations performed by the network device in the reference signal sending or reference signal receiving method 300 in FIG. 3. Moreover, the various units in the network device 30 and other operations and/or functions described above are for the purpose of implementing a corresponding procedure of the reference signal sending or reference signal receiving method 300 in FIG. 3. Specifically, the memory 430 is configured to store program code, so that when the processor 410 executes the program code, the processor 410 performs S310 and S320 in the method 300, and controls the transceiver 420 to perform S330 in the method 300 by using the antenna 440. Exemplary processes of performing the foregoing corresponding steps by the various units have been described in detail in the method 300, and for brevity, details are not described herein again.

Figure 11:
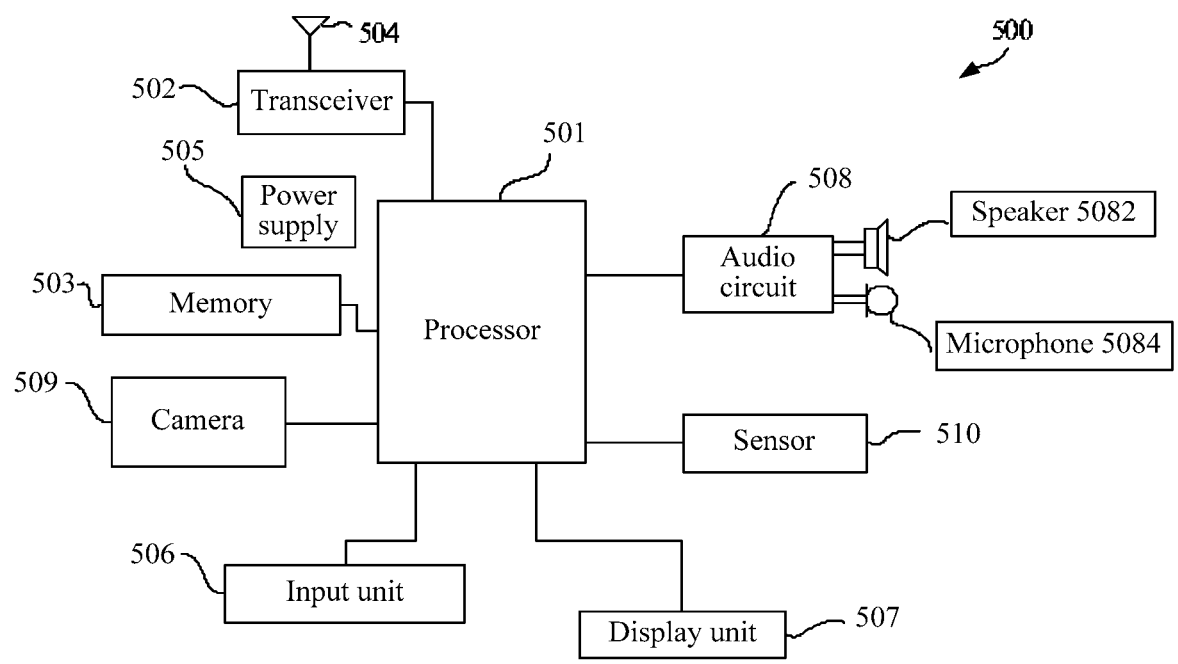
FIG. 11 is another schematic block diagram of a terminal device according to an embodiment of the present invention.

FIG. 11 is another schematic block diagram of a terminal device 500 according to an embodiment of the present invention. As shown in FIG. 11, the terminal device 500 includes a processor 501 and a transceiver 502, and optionally, the terminal device 500 further includes a memory 503. The processor 501, the transceiver 502, and the memory 503 communicate with each other by using an internally connected channel to transmit a control and/or data signal, the memory 503 is configured to store a computer program, and the processor 501 is configured to invoke the computer program from the memory 503 and run the computer program, to control the transceiver 502 to receive or send a signal.

When the computer program stored in the memory 503 is executed by the processor 501, the processor 501 is configured to determine a plurality of resource elements REs used to carry a first CSI-RS from a network device, where the plurality of REs are distributed in a plurality of resource units, and in each resource unit, a plurality of REs used to carry the first CSI-RS are located on a plurality of subcarriers in a same symbol, values of the first CSI-RS carried on at least two REs are different, and values of the first CSI-RS are loaded to the plurality of REs in the resource unit by using a first multiplex code; and the transceiver 502 is configured to receive signals sent by the network device, where the signals includea first CSI-RS, and the processor 501 is further configured to obtain the first CSI-RS on the plurality of REs.

The processor 501 and the memory 503 may be combined into one processing apparatus, and the processor 501 is configured to execute the computer program stored in the memory 503 to implement the foregoing functions. In an exemplary implementation, the memory 503 may be integrated into the processor 501, or independent of the processor 501. The terminal device 500 may further include an antenna 504, configured to send, by using a radio signal, uplink data or uplink control signaling output by the transceiver 502.

Specifically, the terminal device 500 may correspond to the terminal device in the reference signal sending or reference signal receiving method 300 according to embodiments of the present invention, and the terminal device 500 may include modules configured to perform operations performed by the terminal device in the reference signal sending or reference signal receiving method 300 in FIG. 3. Moreover, the various modules in the terminal device 500 and other operations and/or functions described above are for the purpose of implementing a corresponding procedure of the reference signal sending or reference signal receiving method 300 in FIG. 3. Specifically, the memory 503 is configured to store program code, so that when the processor 501 executes the program code, the processor 501 controls the transceiver 502 to perform S340 in the method 300 and perform S350 in the method 300 by using the antenna 504. Exemplary processes of performing the foregoing corresponding steps by the various modules have been described in detail in the method 300, and for brevity, details are not described herein again.

The processor 501 may be configured to perform an action implemented inside a terminal as described in the foregoing method embodiments, and the transceiver 502 may be configured to perform an action of transmission or sending from a terminal to a network device as described in the foregoing method embodiments. For details, refer to the descriptions of the foregoing method embodiments, and details are not described herein again.

The processor 501 and the memory 503 may be integrated into one processing apparatus, and the processor 501 is configured to execute the computer program stored in the memory 503 to implement the foregoing functions. In an exemplary implementation, the memory 503 may alternatively be integrated into the processor 501.

The foregoing terminal device 500 may further include a power supply 505, configured to supply power to various components or circuits in the terminal.

In addition, to perform functions of the terminal device, the terminal device 500 may further include one or more of an input unit 506, a display unit 507, an audio circuit 508, a camera 509, and a sensor 510, and the audio circuit may further include a speaker 5082, a microphone 5084, and the like.

It should be understood that, the processor in this embodiment of the present invention may be a central processing unit (CPU), or may further be another general purpose processor, a digital signal processor (DSP), an application-specific integrated circuit (ASIC), a field programmable gate array (FPGA), or another programmable logic device, discrete gate or transistor logic device, discrete hardware component, or the like.

It should be further understood that the memory in this embodiment of the present invention may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented through software, hardware, firmware, or any combination thereof. When software is used to implement the embodiments, the foregoing embodiments may be implemented partially in a form of a computer program product. The computer program product includes one or more computer instructions. When the computer program instructions are loaded or executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, and a magnetic tape), an optical medium (for example, a digital versatile disc (DVD)), or a semiconductor medium. The semiconductor medium may be a solid-state drive.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, technical solutions of this application may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a Universal Serial Bus (USB) flash drive, a removable hard disk, a read-only memory (ROM), a random access memory (RAM), a magnetic disk, or a compact disc.

The foregoing descriptions are merely exemplary implementations of this application, and are not intended to limit the protection scope of this application. Any variation or replacement readily figured out by a person skilled in the art within the technical scope disclosed in this application may fall within the protection scope of this application. The protection scope of this application shall be subject to the protection scope of the claims.

Additionally, statements made herein characterizing the invention refer to an embodiment of the invention and not necessarily all embodiments.

The invention claimed is:
1. A reference signal sending method, comprising:
  determining, by a first device, a plurality of resource elements (REs) for carrying a first channel state information reference signal (CSI-RS) of one CSI-RS port, wherein the plurality of REs are within a plurality of resource units, and wherein in each resource unit, values of the first CSI-RS carried on at least two REs in one symbol are different and are from one first pilot sequence, and the values of the first CSI-RS carried on the at least two REs in the resource unit are multiplexed by a first multiplex code; and sending, by the first device, the first CSI-RS to a second device.

2. The method according to claim 1, wherein values of the first CSI-RS carried on all REs in each resource unit are different from each other.

3. The method according to claim 1, wherein multiple REs in each resource unit carry a second CSI-RS, values of the second CSI-RS carried on at least two REs in one symbol are different, and values of the second CSI-RS are loaded to the multiple REs in each resource unit by using a second multiplex code.

4. The method according to claim 1, wherein the first pilot sequence is correlated to a first parameter a, and a value of the first parameter a comprises at least one of the following:
a length of an orthogonal code used by a CSI-RS port during frequency domain code division multiplexing; or
a quantity of REs occupied by a CSI-RS port in one symbol in one resource unit.

5. The method according to claim 4, wherein the first parameter a is sent through a Radio Resource Control (RRC) signaling.

6. The method according to claim 1, wherein the first pilot sequence is correlated to a first parameter a, and a value of the first parameter a is 2.

7. An apparatus, comprising:
at least one processor configured to execute the processor-executable instructions to facilitate the following being performed by the apparatus:
determining a plurality of resource elements (REs) for carrying a first channel state information reference signal (CSI-RS) of one CSI-RS port, wherein the plurality of REs are within a plurality of resource units, and wherein in each resource unit, values of the first CSI-RS carried on at least two REs in one symbol are different and are from one first pilot sequence, and the values of the first CSI-RS carried on the at least two REs in the resource unit are multiplexed by a first multiplex code; and
sending the first CSI-RS.

8. The apparatus according to claim 7, wherein values of the first CSI-RS carried on all REs in each resource unit are different from each other.

9. The apparatus according to claim 7, wherein multiple REs in each resource unit carry a second CSI-RS, values of the second CSI-RS carried on at least two REs in one symbol are different, and values of the second CSI-RS are loaded to the multiple REs in each resource unit by using a second multiplex code.

10. The apparatus according to claim 7, wherein the first pilot sequence is correlated to a first parameter a, and a value of the first parameter a comprises at least one of the following:
a length of an orthogonal code used by a CSI-RS port during frequency domain code division multiplexing; or
a quantity of REs occupied by a CSI-RS port in one symbol in one resource unit.

11. The apparatus according to claim 7, wherein the first pilot sequence is correlated to a first parameter a, and a value of the first parameter a is 2.

12. The apparatus according to claim 11, wherein the first parameter a is sent through a Radio Resource Control (RRC) signaling.

13. A reference signal receiving method, comprising:
receiving, by a second device on a plurality of resource units, a first channel state information reference signal (CSI-RS) of one CSI-RS port from a first device;
determining, by the second device, a plurality of resource elements (REs) for carrying the first CSI-RS, wherein the plurality of REs are within a plurality of resource units, and wherein in each resource unit, multiple REs of the plurality of REs are located on a plurality of subcarriers in a same symbol, values of the first CSI-RS carried on at least two REs are different and are from one first pilot sequence, and the values of the first CSI-RS carried on the at least two REs in the resource unit are multiplexed by a first multiplex code; and
obtaining, by the second device, the first CSI-RS on the determined plurality of REs.

14. The method according to claim 13, wherein values of the first CSI-RS carried on all REs in each resource unit are different from each other.

15. The method according to claim 13, wherein multiple REs in each resource unit carry a second CSI-RS, values of the second CSI-RS carried on at least two REs in one symbol are different, and values of the second CSI-RS are loaded to the multiple REs in each resource unit by using a second multiplex code.

16. The method according to claim 15, wherein the first pilot sequence is correlated to a first parameter a, and a value of the first parameter a comprises at least one of the following:
a length of an orthogonal code used by a CSI-RS port during frequency domain code division multiplexing; or
a quantity of REs occupied by a CSI-RS port in one symbol in one resource unit.

17. The method according to claim 16, wherein the first parameter a is received through a Radio Resource Control (RRC) signaling.

18. The method according to claim 13, wherein the first pilot sequence is correlated to a first parameter a, and a value of the first parameter a is 2.

19. An apparatus, comprising:
at least one processor configured to execute the processor-executable instructions to facilitate the following being performed by the apparatus:
receiving, on a plurality of resource units, a first channel state information reference signal (CSI-RS) of one CSI-RS port;
determining a plurality of resource elements (REs) for carrying the first CSI-RS, wherein the plurality of REs are within a plurality of resource units, and wherein in each resource unit, multiple REs of the plurality of REs are located on a plurality of subcarriers in a same symbol, values of the first CSI-RS carried on at least two REs are different and are from one first pilot sequence, and the values of the first CSI-RS carried on the at least two REs in the resource unit are multiplexed by a first multiplex code; and
obtaining the first CSI-RS on the determined plurality of REs.

20. The apparatus according to claim 19, wherein values of the first CSI-RS carried on all REs in each resource unit are different from each other.

21. The apparatus according to claim 19, wherein multiple REs in each resource unit carry a second CSI-RS, values of the second CSI-RS carried on at least two REs in one symbol are different, and values of the second CSI-RS are loaded to the multiple REs in each resource unit by using a second multiplex code.

22. The apparatus according to claim 19, wherein the first pilot sequence is correlated to a first parameter a, and a value of the first parameter a comprises at least one of the following:
- a length of an orthogonal code used by a CSI-RS port during frequency domain code division multiplexing; or
- a quantity of REs occupied by a CSI-RS port in one symbol in one resource unit.

23. The apparatus according to claim 22, wherein the first parameter a is received through a Radio Resource Control (RRC) signaling.

24. The apparatus according to claim 19, wherein the first pilot sequence is correlated to a first parameter a, and a value of the first parameter a is 2.

* * * * *

UNITED STATES PATENT AND TRADEMARK OFFICE
CERTIFICATE OF CORRECTION

| | | |
|---|---|---|
| PATENT NO. | : 11,784,765 B2 | Page 1 of 1 |
| APPLICATION NO. | : 17/721138 | |
| DATED | : October 10, 2023 | |
| INVENTOR(S) | : Wu et al. | |

It is certified that error appears in the above-identified patent and that said Letters Patent is hereby corrected as shown below:

In the Claims

Claim 7: Column 29, Line 28: "at least one processor configured to execute the processor-" should read -- at least one processor configured to execute processor- --.

Claim 19: Column 30, Line 41: "at least one processor configured to execute the processor-" should read -- at least one processor configured to execute processor- --.

Signed and Sealed this
Twenty-third Day of January, 2024

Katherine Kelly Vidal
*Director of the United States Patent and Trademark Office*